United States Patent
Kim et al.

(10) Patent No.: US 9,762,908 B2
(45) Date of Patent: Sep. 12, 2017

(54) METHOD AND DEVICE FOR ENCODING VIDEO TO LIMIT BIDIRECTIONAL PREDICTION AND BLOCK MERGING, AND METHOD AND DEVICE FOR DECODING VIDEO

(71) Applicant: SAMSUNG ELECTRONICS CO., LTD., Suwon-si (KR)

(72) Inventors: Jae-moon Kim, Yongin-si (KR); Ki-won Yoo, Seoul (KR); Jae-Hyun Kim, Seoul (KR); Kyo-hyuk Lee, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 504 days.

(21) Appl. No.: 14/336,072

(22) Filed: Jul. 21, 2014

(65) Prior Publication Data
US 2014/0328388 A1 Nov. 6, 2014

Related U.S. Application Data

(63) Continuation of application No. PCT/KR2013/000490, filed on Jan. 21, 2013.
(Continued)

(51) Int. Cl.
*H04N 7/12* (2006.01)
*H04N 11/02* (2006.01)
(Continued)

(52) U.S. Cl.
CPC ......... *H04N 19/105* (2014.11); *H04N 19/139* (2014.11); *H04N 19/176* (2014.11); *H04N 19/513* (2014.11); *H04N 19/577* (2014.11)

(58) Field of Classification Search
None
See application file for complete search history.

(56) References Cited

U.S. PATENT DOCUMENTS

| 2004/0125876 A1 | 7/2004 | Kodama et al. |
| 2007/0014358 A1 | 1/2007 | Tourapis et al. |

(Continued)

FOREIGN PATENT DOCUMENTS

| JP | 10-145792 A | 5/1998 |
| KR | 10-2011-0112240 A | 10/2011 |
| WO | 2007/092192 A2 | 8/2007 |

OTHER PUBLICATIONS

International Search Report for PCT/KR2013/000490 dated Apr. 22, 2013 [PCT/ISA/220 & 210].
(Continued)

*Primary Examiner* — Sath V Perungavoor
*Assistant Examiner* — Xiaolan Xu
(74) *Attorney, Agent, or Firm* — Sughrue Mion, PLLC

(57) ABSTRACT

Provided are a method and apparatus for encoding a video and a method and apparatus for decoding a video. The method of encoding includes: determining, for a current block, bidirectional motion estimation information comprising an L0 motion vector, an L1 motion vector, an L0 reference vector, and an L1 reference picture by performing bidirectional motion estimation on the current block; determining whether to use the determined bidirectional motion estimation information as prediction information of the current block based on whether the L0 reference picture and the L1 reference picture are the same and based on a difference value between the L0 motion vector and the L1 motion vector; and in response to determining to use the determined bidirectional motion estimation information as the prediction information of the current block, encoding the
(Continued)

determined bidirectional motion estimation information as the prediction information of the current block.

6 Claims, 18 Drawing Sheets

Related U.S. Application Data

(60) Provisional application No. 61/588,654, filed on Jan. 19, 2012.

(51) Int. Cl.

| | | |
|---|---|---|
| *H04N 11/04* | (2006.01) | |
| *H04N 19/105* | (2014.01) | |
| *H04N 19/139* | (2014.01) | |
| *H04N 19/176* | (2014.01) | |
| *H04N 19/513* | (2014.01) | |
| *H04N 19/577* | (2014.01) | |

(56) References Cited

U.S. PATENT DOCUMENTS

| | | | |
|---|---|---|---|
| 2008/0117977 A1* | 5/2008 | Lee | H04N 19/56 375/240.16 |
| 2009/0067505 A1 | 3/2009 | Tourapis et al. | |
| 2011/0293195 A1 | 12/2011 | Nakagami et al. | |
| 2013/0083851 A1 | 4/2013 | Alshin et al. | |

OTHER PUBLICATIONS

Written Opinion for PCT/KR2013/000490 dated Apr. 22, 2013 [PCT/ISA/237].

International Preliminary Report on Patentability for PCT/KR2013/000490 dated Jul. 22, 2014 [PCT/IB/373].

* cited by examiner

FIG. 7
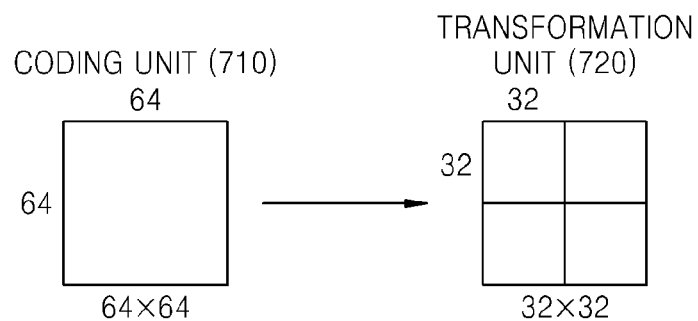
FIG. 8
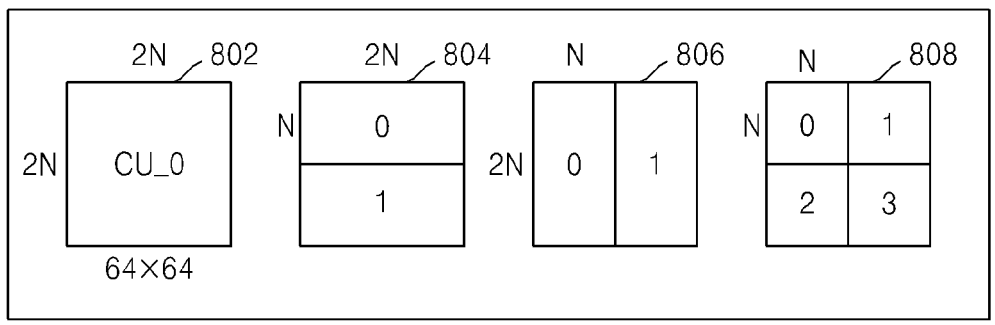
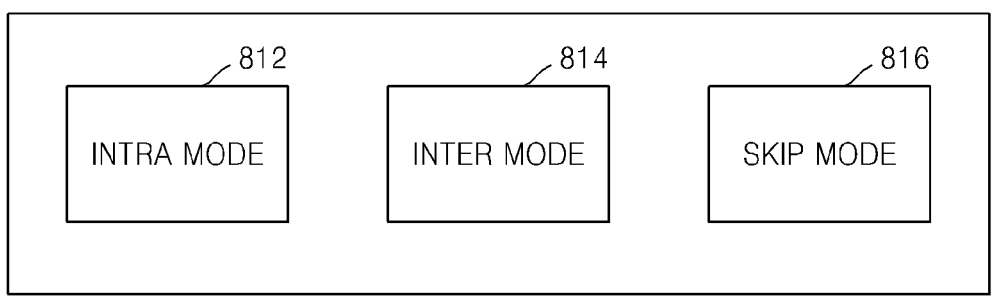
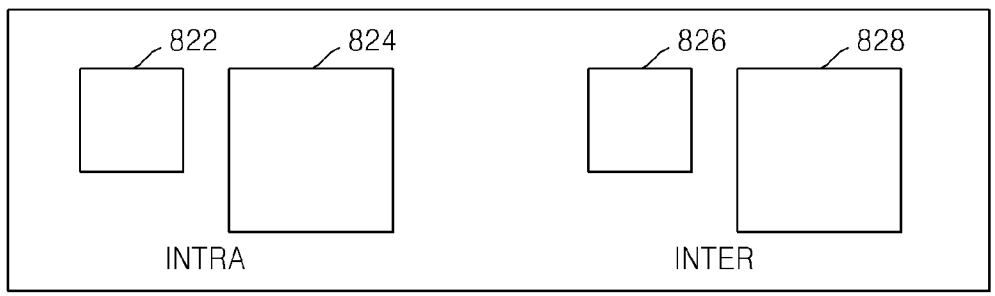

CODING UNIT (1010)

PREDICTION UNIT (1060)

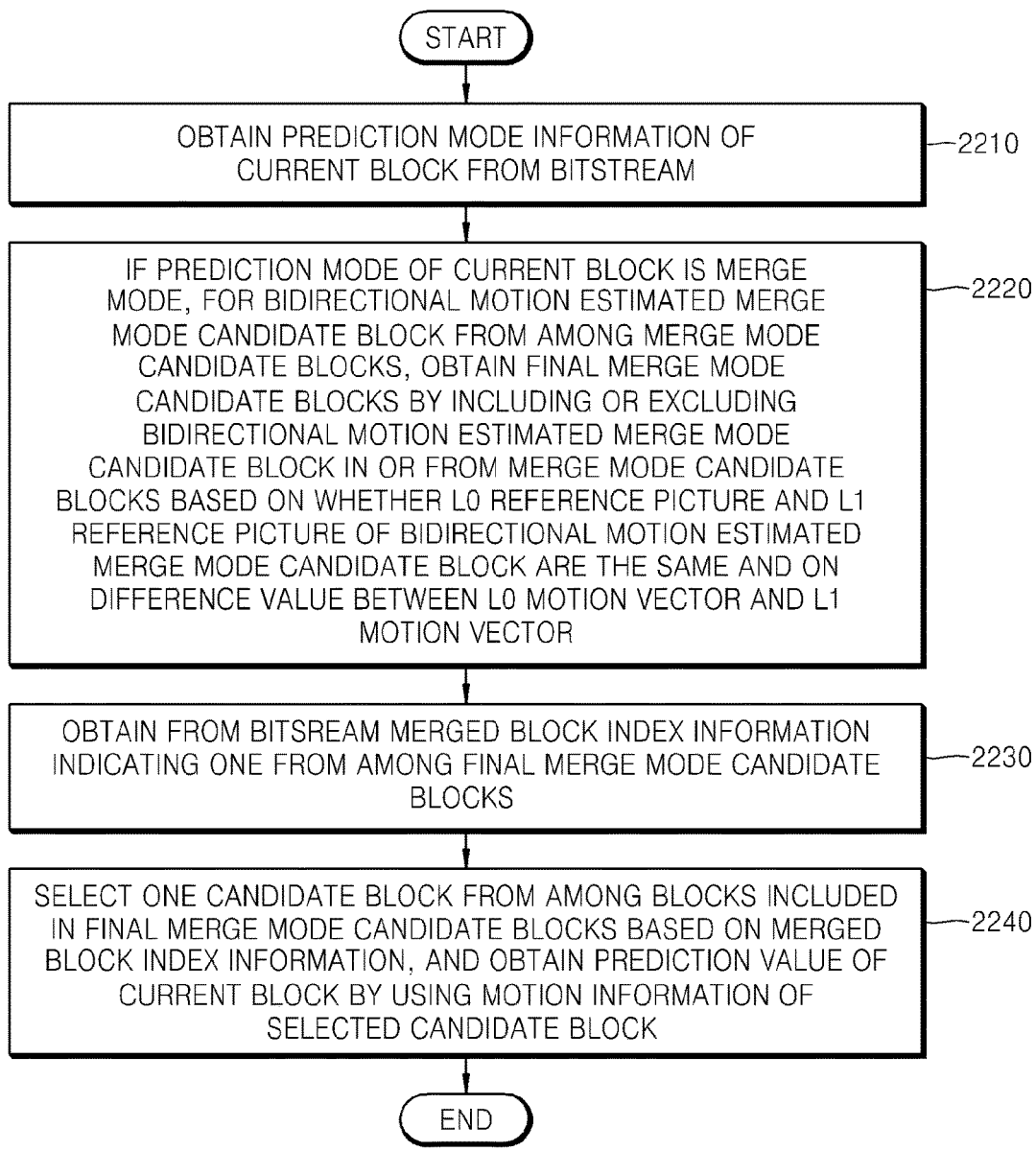

METHOD AND DEVICE FOR ENCODING VIDEO TO LIMIT BIDIRECTIONAL PREDICTION AND BLOCK MERGING, AND METHOD AND DEVICE FOR DECODING VIDEO

CROSS-REFERENCE TO RELATED APPLICATIONS

This application is a continuation of PCT/KR2013/000490, filed on Jan. 21, 2013, which claims the benefit of U.S. Provisional Application No. 61/588,564, filed on Jan. 19, 2012, all the disclosures of which are incorporated herein in their entireties by reference.

BACKGROUND

1. Field

Apparatuses and methods consistent with exemplary embodiments relate to video encoding and decoding.

2. Description of the Related Art

As hardware capable of reproducing and storing high-resolution or high-quality video content has been developed and distributed, the need for a video codec capable of effectively encoding or decoding high-resolution or high-quality video content has increased. A related art video codec encodes a video according to a limited encoding method using a macroblock having a predetermined size.

Inter prediction, which is a method of compressing an image by removing temporal redundancy between pictures, uses motion estimation and motion compensation. The motion estimation involves predicting blocks of a current picture by using at least one reference picture. During bidirectional prediction, a block may have two pieces of motion information. During bidirectional prediction, since motion estimation is performed twice, the hardware load is higher than that during unidirectional prediction.

SUMMARY

Aspects of one or more exemplary embodiments reduce the amount of computation during image processing without degrading an image quality.

According to aspects of one or more exemplary embodiments, bidirectional motion estimation or block merging is limited based on whether an L0 reference picture and an L1 reference picture included in two pieces of motion information of a bidirectional motion estimated block are the same and on a difference value between an L0 motion vector and an L1 motion vector.

According to aspects of one or more exemplary embodiments, since bidirectional prediction and block merging that increase the amount of hardware computation are performed only under specific conditions, the computational complexity during video encoding/decoding may be reduced without greatly degrading the image quality.

According to an aspect of an exemplary embodiment, there is provided a method of encoding an image, the method including: determining, for a current block, bidirectional motion estimation information including an L0 motion vector, an L1 motion vector, an L0 reference vector, and an L1 reference picture by performing bidirectional motion estimation on the current block; determining whether to use the determined bidirectional motion estimation information as prediction information of the current block based on whether the L0 reference picture and the L1 reference picture are the same and based on a difference value between the L0 motion vector and the L1 motion vector; and in response to determining to use the determined bidirectional motion estimation information is used as the prediction information of the current block, encoding the determined bidirectional motion estimation information as the prediction information of the current block.

According to an aspect of another exemplary embodiment, there is provided a method of encoding an image, the method including: for a bidirectional motion estimated merge mode candidate block from among merge mode candidate blocks that are temporally and spatially related to a current block, determining whether the bidirectional motion estimated merge mode candidate block and the current block are merged with each other based on whether an L0 reference picture and an L1 reference picture of the bidirectional motion estimated merge mode candidate block are the same and based on a difference value between an L0 motion vector and an L1 motion vector; obtaining final merge mode candidate blocks by including or excluding, based on a result of the determining, the bidirectional motion estimated merge mode candidate block in or from the merge mode candidate blocks; obtaining a prediction value of the current block by using motion information of blocks among the obtained final merge mode candidate blocks; determining a final prediction mode for the current block; and in response to determining the final prediction mode as a merge mode that uses motion information of one block from among the final merge mode candidate blocks as motion information of the current block, outputting a predetermined syntax indicating that the prediction mode of the current block is the merge mode.

According to an aspect of another exemplary embodiment, there is provided an apparatus for encoding an image, the apparatus including: a motion estimator configured to determine, for a current block, bidirectional motion estimation information comprising an L0 motion vector, an L1 motion vector, an L0 reference picture, and an L1 reference picture by performing bidirectional motion estimation on the current block, and to determine whether to use the determined bidirectional motion estimation information as prediction information of the current block based on whether the L0 reference picture and the L1 reference picture are the same and based on a difference value between the L0 motion vector and the L1 motion vector; and an entropy encoder configured to, in response to the motion estimator determining to use the determined bidirectional motion estimation information as the prediction information of the current block, encode the determined bidirectional motion estimation information as the prediction information of the current block.

According to an aspect of another exemplary embodiment, there is provided an apparatus for encoding an image, the apparatus including: a merge mode candidate block determiner configured to, for a bidirectional motion estimated merge mode candidate block from among merge mode candidate blocks that are temporally and spatially related to a current block, determine whether the bidirectional motion estimated merge mode candidate block and the current block are merged with each other based on whether an L0 reference picture and an L1 reference picture of the bidirectional motion estimated merge mode candidate block are the same and based on a difference value between an L0 motion vector and an L1 motion vector, and to obtain final merge mode candidate blocks by including or excluding, based on a result of the determining, the bidirectional motion estimated merge mode candidate block in or from the merge mode candidate blocks; a predictor configured to obtain a prediction value of the current block by using motion information of blocks among the obtained final merge mode candidate blocks and to determine a final prediction mode for the current block; and an entropy encoder configured to, in response to the predictor determining the final prediction mode as a merge mode that uses motion information of a block obtained by merging one block from among the final merge mode candidate blocks with the current block as motion information of the current block, output a predetermined syntax indicating that a prediction mode of the current block is the merge mode.

According to an aspect of another exemplary embodiment, there is provided a method of decoding an image, the method including: obtaining, from a bitstream, prediction mode information of a current block; if the current block is bidirectional motion estimated, obtaining bidirectional motion estimation information including an L0 motion vector, an L1 motion vector, an L0 reference picture, and an L1 reference picture of the current block from the bitstream; and obtaining a prediction value of the current block by using the obtained bidirectional motion estimation information, wherein the bidirectional motion estimated current block includes the L0 reference picture and the L1 reference picture that are the same and the L0 motion vector and the L1 motion vector having a difference equal to or less than a predetermined threshold value as the bidirectional motion estimation information.

According to an aspect of another exemplary embodiment, there is provided a method of decoding an image, the method including: obtaining, from a bitstream, prediction mode information of a current block; if a prediction mode of the current block is a merge mode that uses, as motion information of the current block, motion information of one block selected from among temporally and spatially related merge mode candidate blocks, obtaining, for a bidirectional motion estimated merge mode candidate block from among the merge mode candidate blocks, final merge mode candidate blocks by including or excluding, in or from the merge mode candidate blocks, the bidirectional motion estimated merge mode candidate block based on whether an L0 reference picture and an L1 reference picture of the bidirectional motion estimated merge mode candidate block are the same and based on a difference value between an L0 motion vector and an L1 motion vector; obtaining merged block index information indicating one block from among the final merge mode candidate blocks from the bitstream; and selecting one candidate block from among blocks included in the final merge mode candidate blocks based on the obtained merged block index information, and obtaining a prediction value of the current block by using motion information of the selected candidate block.

According to an aspect of another exemplary embodiment, there is provided an apparatus for decoding an image, the apparatus including: an entropy decoder configured to obtain, from a bitstream, prediction mode information of a current block; and a predictor configured to, when the current block is bidirectional motion estimated, obtain bidirectional motion estimation information including an L0 motion vector, an L1 motion vector, an L0 reference picture, and an L1 reference picture of the current block from the bitstream, and to obtain a prediction value of the current block by using the obtained bidirectional motion estimation information, wherein the bidirectional motion estimated current block includes the L0 reference picture and the L1 reference picture that are the same and the L0 motion vector and the L1 motion vector having a difference equal to or less than a predetermined threshold value as the bidirectional motion estimation information.

According to an aspect of another exemplary embodiment, there is provided an apparatus for decoding an image, the apparatus including: an entropy decoder configured to obtain, from a bitstream, prediction mode information of a current block; a merge mode candidate block determiner configured to, when a prediction mode of the current block is a merge mode that uses, as motion information of the current block, motion information of one block selected from among temporally and spatially related merge mode candidate blocks, for a bidirectional motion estimated merge mode candidate block from among merge mode candidate blocks, final merge mode candidate blocks by including or excluding, in or from the merge mode candidate blocks, the bidirectional motion estimated merge mode candidate block based on whether an L0 reference picture and an L1 reference picture of the bidirectional motion estimated merge mode candidate block are the same and based on a difference value between an L0 motion vector and an L1 motion vector; and a predictor configured to obtain merged block index information indicating one block from among the final merge mode candidate blocks from the bitstream, to select one candidate block from among blocks included in the final merge mode candidate blocks based on the obtained merged block index information, and to obtain a prediction value of the current block by using motion information of the selected candidate block.

DESCRIPTION OF DRAWINGS

FIG. 7 is a diagram for describing a relationship between a coding unit and transformation units, according to an exemplary embodiment;

FIG. 8 is a diagram for describing encoding information of coding units corresponding to a coded depth, according to an exemplary embodiment;

FIG. 22 is a flowchart illustrating a method of decoding an image, according to another exemplary embodiment.

DETAILED DESCRIPTION OF EXEMPLARY EMBODIMENTS

Exemplary embodiments will now be described more fully with reference to the accompanying drawings.

Figure 1:
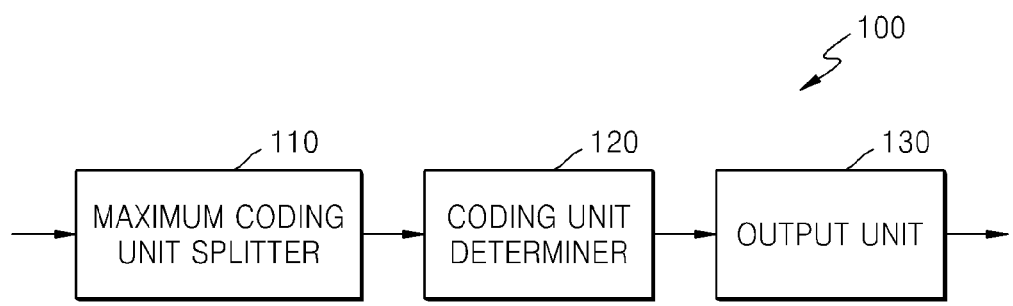
FIG. 1 is a block diagram of a video encoding apparatus according to an exemplary embodiment.

FIG. 1 is a block diagram of a video encoding apparatus 100 according to an exemplary embodiment.

The video encoding apparatus 100 according to an exemplary embodiment includes a maximum coding unit splitter 110, a coding unit determiner 120, and an output unit 130.

The maximum coding unit splitter 110 may split a current picture based on a maximum coding unit having a maximum size for the current picture of an image. If the current picture is larger than the maximum coding unit, image data of the current picture may be split into the at least one maximum coding unit. The maximum coding unit according to an exemplary embodiment may be a data unit having a size of 32×32, 64×64, 128×128, or 256×256, wherein a shape of the data unit is a square having a width and length of 2. The image data may be output to the coding unit determiner 120 according to the at least one maximum coding unit.

A coding unit according to an exemplary embodiment may be characterized by a maximum size and a depth. The depth denotes a number of times the coding unit is spatially split from the maximum coding unit, and as the depth increases, deeper coding units according to depths may be split from the maximum coding unit to a minimum coding unit. A depth of the maximum coding unit may be defined as an uppermost depth and a depth of the minimum coding unit may be defined as a lowermost depth. Since a size of a coding unit corresponding to to each depth decreases as the depth of the maximum coding unit increases, a coding unit corresponding to an upper depth may include a plurality of coding units corresponding to lower depths.

As described above, the image data of the current picture is split into the maximum coding units according to a maximum size of the coding unit, and each of the maximum coding units may include deeper coding units that are split according to depths. Since the maximum coding unit according to an exemplary embodiment is split according to depths, the image data of a spatial domain included in the maximum coding unit may be hierarchically classified according to depths.

A maximum depth and a maximum size of a coding unit, which limit a total number of times a height and a width of the maximum coding unit are hierarchically split, may be previously set.

The coding unit determiner 120 encodes at least one split region obtained by splitting a region of the maximum coding unit according to depths, and determines a depth to output finally encoding results according to the at least one split region. In other words, the coding unit determiner 120 determines a coded depth by encoding the image data in the deeper coding units according to depths, according to the maximum coding unit of the current picture, and by selecting a depth having a least encoding error. The determined coded depth and the image data according to the maximum coding unit are output to the output unit 130.

The image data in the maximum coding unit is encoded based on the deeper coding units corresponding to at least one depth equal to or less than the maximum depth, and encoding results are compared based on each of the deeper coding units. A depth having the least encoding error may be selected after comparing encoding errors of the deeper coding units. At least one coded depth may be selected for each maximum coding unit.

A size of the maximum coding unit is split as a coding unit is hierarchically split according to depths, and a number of coding units increases. Also, even if coding units correspond to the same depth in one maximum coding unit, it is determined whether to split each of the coding units corresponding to the same depth to a lower depth by measuring an encoding error of the data of each coding unit, separately. Accordingly, even when data is included in one maximum coding unit, the encoding errors according to depths may differ according to regions, and thus the coded depths may differ according to regions. Thus, one or more coded depths may be set for one maximum coding unit, and the data of the maximum coding unit may be divided according to coding units of the one or more coded depths.

Accordingly, the coding unit determiner 120 according to an exemplary embodiment may determine coding units that have a tree structure and are included in the current maximum coding unit. The 'coding units that have the tree structure' according to an exemplary embodiment include coding units from among all deeper coding units included in the current maximum coding unit and which correspond to a depth determined to be a coded depth. A coding unit of a coded depth may be hierarchically determined according to depths in the same region of the maximum coding unit, and may be independently determined in different regions. Similarly, a coded depth in a current region may be independently determined from a coded depth in another region.

A maximum depth according to an exemplary embodiment is an index related to a number of times splitting is performed from a maximum coding unit to a minimum coding unit. A first maximum depth according to an exemplary embodiment may denote a total number of times splitting is performed from the maximum coding unit to the minimum coding unit. A second maximum depth according to an exemplary embodiment may denote a total number of depth levels from the maximum coding unit to the minimum coding unit. For example, when a depth of the maximum coding unit is 0, a depth of a coding unit in which the maximum coding unit is split once may be set to 1, and a depth of a coding unit in which the maximum coding unit is split twice may be set to 2. In this case, if a coding unit obtained by splitting the maximum coding unit four times is a minimum coding unit, 5 depth levels of depths 0, 1, 2, 3 and 4 exist, and thus the first maximum depth may be set to 4 and the second maximum depth may be set to 5.

Prediction encoding and frequency transformation of the maximum coding unit may be performed. The prediction encoding and the frequency transformation are also performed based on the deeper coding units according to depths equal to or less than the maximum depth, according to the maximum coding unit.

Since a number of deeper coding units increases whenever the maximum coding unit is split according to depths, encoding, including the prediction encoding and the frequency transformation, has to be performed on all of the deeper coding units generated as the depth increases. For convenience of description, the prediction encoding and the frequency transformation will now be described based on a coding unit of a current depth from among at least one maximum coding unit.

The video encoding apparatus 100 according to an exemplary embodiment may variously select a size or shape of a data unit for encoding the image data. In order to encode the image data, operations such as prediction encoding, frequency transformation, and entropy encoding are performed, and at this time, the same data unit may be used for all operations or different data units may be used for each operation.

For example, the video encoding apparatus 100 may select not only a coding unit for encoding the image data, but also a data unit different from the coding unit so as to perform the prediction encoding on the image data in the coding unit.

In order to perform prediction encoding in the maximum coding unit, the prediction encoding may be performed based on a coding unit corresponding to a coded depth, i.e., based on a coding unit that is no longer split into coding units corresponding to a lower depth. Hereinafter, the coding unit that is no longer split and becomes a basis unit for prediction encoding will now be referred to as a 'prediction unit'. A partition obtained by splitting the prediction unit may include a prediction unit and a data unit obtained by splitting at least one of a height and a width of the prediction unit.

For example, when a coding unit of 2N×2N (where N is a positive integer) is no longer split, the coding unit may become a prediction unit of 2N×2N and a size of a partition may be 2N×2N, 2N×N, N×2N, or N×N. Examples of a partition type include symmetrical partitions that are obtained by symmetrically splitting a height or width of the prediction unit, partitions obtained by asymmetrically splitting the height or width of the prediction unit, such as 1:n or n:1, partitions that are obtained by geometrically splitting the prediction unit, and partitions having arbitrary shapes.

A prediction mode of the prediction unit may be at least one of an intra mode, a inter mode, and a skip mode. For example, the intra mode and the inter mode may be performed on the partition of 2N×2N, 2N×N, N×2N, or N×N. Also, the skip mode may be performed only on the partition of 2N×2N. The encoding is independently performed on one prediction unit in a coding unit, thereby selecting a prediction mode having a least encoding error.

The video encoding apparatus 100 according to an exemplary embodiment may also perform the frequency transformation on the image data in a coding unit based not only on the coding unit for encoding the image data but also based on a data unit that is different from the coding unit.

In order to perform the frequency transformation in the coding unit, the frequency transformation may be performed based on a data unit having a size smaller than or equal to the coding unit. For example, the data unit for the frequency transformation may include a data unit for an intra mode and a data unit for an inter mode.

A data unit used as a base of the frequency transformation will now be referred to as a 'transformation unit'. Similarly to the coding unit, the transformation unit in the coding unit may be recursively split into smaller sized transformation units, and thus, residual data in the coding unit may be divided according to the transformation unit having a tree structure according to transformation depths.

A transformation depth indicating a number of times splitting is performed to reach the transformation unit by splitting the height and width of the coding unit may also be set in the transformation unit according to an exemplary embodiment. For example, in a current coding unit of 2N×2N, a transformation depth may be 0 when the size of a transformation unit is 2N×2N, may be 1 when the size of a transformation unit is N×N, and may be 2 when the size of a transformation unit is N/2×N/2. That is, the transformation unit having the tree structure may also be set according to transformation depths.

Encoding information according to coding units corresponding to a coded depth requires not only information about the coded depth but also information related to prediction encoding and frequency transformation. Accordingly, the coding unit determiner 120 may not only determine a coded depth having a least encoding error but also determine a partition type in a prediction unit, a prediction mode according to prediction units, and a size of a transformation unit for frequency transformation.

Coding units having a tree structure in a maximum coding unit and a method of determining a partition according to an exemplary embodiment will be described below in detail with reference to FIGS. 3 through 12.

The coding unit determiner 120 may measure an encoding error of deeper coding units according to depths by using Rate-Distortion (RD) Optimization based on Lagrangian multipliers.

The output unit 130 outputs the image data of the maximum coding unit, which is encoded based on the at least one coded depth determined by the coding unit determiner 120, and information about the encoding mode according to the coded depth in bitstreams.

The encoded image data may be obtained by encoding residual data of an image.

The information about the encoding mode according to the coded depth may include information about the coded depth, the partition type in the prediction unit, the prediction mode, and the size of the transformation unit.

The information about the coded depth may be defined by using split information according to depths, the split information indicating whether encoding is performed on coding units of a lower depth instead of a current depth. If the current depth of the current coding unit is the coded depth, the encoding is performed on the current coding unit of the current depth, and thus the split information may be defined not to split the current coding unit to a lower depth. Alternatively, if the current depth of the current coding unit is not the coded depth, the encoding is performed on the coding unit of the lower depth, and thus the split information of the current depth may be defined to split the current coding unit to obtain the coding units of the lower depth.

If the current depth is not the coded depth, encoding is performed on the coding unit that is split into the coding unit of the lower depth. Since at least one coding unit of the lower depth exists in one coding unit of the current depth, the encoding is repeatedly performed on each coding unit of the lower depth, and thus the encoding may be recursively performed for the coding units having the same depth.

Since the coding units having a tree structure are determined in one maximum coding unit and information about at least one encoding mode is determined for a coding unit of a coded depth, information about at least one encoding mode may be determined for one maximum coding unit. Also, a coded depth of the data of the maximum coding unit may be different according to locations since the data is hierarchically split according to depths, and thus information about the coded depth and the encoding mode may be set for the data.

Accordingly, the output unit 130 according to an exemplary embodiment may assign encoding information about a corresponding coded depth and an encoding mode to at least one of the coding unit, the prediction unit, and a minimum unit included in the maximum coding unit.

The minimum unit according to an exemplary embodiment is a rectangular data unit obtained by splitting the minimum coding unit constituting a lowermost depth by 4. Alternatively, the minimum unit may be a maximum rectangular data unit that may be included in all of the coding units, prediction units, partition units, and transformation units included in the maximum coding unit.

For example, the encoding information output through the output unit 130 may be classified into encoding information according to deeper coding units according to depths, and encoding information according to prediction units. The encoding information according to the deeper coding units according to depths may include the information about the prediction mode and about the size of the partitions. The encoding information according to the prediction units may include information about an estimated direction of an inter mode, about a reference image index of the inter mode, about a motion vector, about a chroma component of an intra mode, and about an interpolation method of the intra mode. Also, information about a maximum size of the coding unit defined according to pictures, slices, or GOPs, and information about a maximum depth may be inserted into a header of a bitstream.

In the video encoding apparatus 100 according to an exemplary embodiment, the deeper coding unit is a coding unit obtained by dividing a height or width of a coding unit of an upper depth, which is one layer above, by two. In other words, when the size of the coding unit of the current depth is 2N×2N, the size of the coding unit of the lower depth is N×N. Also, the coding unit of the current depth having the size of 2N×2N may include a maximum number of 4 coding units of the lower depth.

Accordingly, the video encoding apparatus 100 according to an exemplary embodiment may form the coding units having the tree structure by determining coding units having an optimum shape and an optimum size for each maximum coding unit, based on the size of the maximum coding unit and the maximum depth determined considering characteristics of the current picture. Also, since encoding may be performed on each maximum coding unit by using any one of various prediction modes and frequency transformations, an optimum encoding mode may be determined considering image characteristics of the coding unit of various image sizes.

Thus, if an image having high resolution or a large data amount is encoded in a related art macroblock, a number of macroblocks per picture excessively increases. Accordingly, a number of pieces of compressed information generated for each macroblock increases, and thus, it is difficult to transmit the compressed information and data compression efficiency decreases. However, by using the video encoding apparatus 100 according to an exemplary embodiment, image compression efficiency may be increased since a coding unit is adjusted while considering characteristics of an image by increasing a maximum size of a coding unit in consideration of a size of the image.

Figure 2:
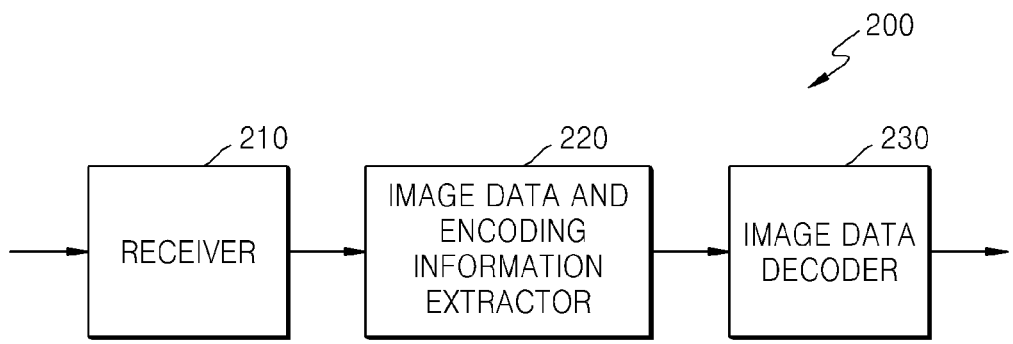
FIG. 2 is a block diagram of a video encoding apparatus according to an exemplary embodiment.

FIG. 2 is a block diagram of a video decoding apparatus 200 according to an exemplary embodiment.

The video decoding apparatus 200 includes a receiver 210, an image data and encoding information extractor 220, and an image data decoder 230. Definitions of various terms such as a coding unit, a depth, a prediction unit, a transformation unit, and information about various encoding modes, for various operations of the video decoding apparatus 200 according to an exemplary embodiment are identical to those described with reference to FIG. 1 and the video encoding apparatus 100.

The receiver 210 receives and parses a bitstream of an encoded video. The image data and encoding information extractor 220 extracts encoded image data for each coding unit from the parsed bitstream, wherein the coding units have a tree structure according to each maximum coding unit, and outputs the extracted image data to the image data decoder 230. The image data and encoding information extractor 220 may extract information about a maximum size of a coding unit of a current picture, from a header about the current picture.

Also, the image data and encoding information extractor 220 extracts from the parsed bitstream information about a coded depth and an encoding mode for the coding units having the tree structure according to each maximum coding unit. The extracted information about the coded depth and the encoding mode is output to the image data decoder 230. In other words, the image data in a bit stream is split into the maximum coding unit so that the image data decoder 230 decodes the image data for each maximum coding unit.

The information about the coded depth and the encoding mode according to the maximum coding unit may be set for information about at least one coded depth, and information about an encoding mode according to each coded depth may include information about a partition type of a corresponding coding unit corresponding to the coded depth, a prediction mode, and a size of a transformation unit. Also, split information according to depths depths may be extracted as the information about the coded depth.

The information about the coded depth and the encoding mode according to each maximum coding unit extracted by the image data and encoding information extractor 220 is information about a coded depth and an encoding mode determined to generate a least encoding error when an encoder, such as the video encoding apparatus 100, repeatedly performs encoding for each deeper coding unit according to depths of each maximum coding unit. Accordingly, the video decoding apparatus 200 may restore an image by decoding the data according to an encoding mode that generates the least encoding error.

Since encoding information about the coded depth and the encoding mode according to an exemplary embodiment may be assigned to a predetermined data unit from among a corresponding coding unit, a prediction unit, and a minimum unit, the image data and encoding information extractor 220 may extract the information about the coded depth and the encoding mode according to the predetermined data units. When the information about the coded depth of the corresponding maximum coding unit and the encoding mode is recorded according to the predetermined data units, the predetermined data units having the same information about the coded depth and the encoding mode may be inferred to be the data units included in the same maximum coding unit.

The image data decoder 230 restores the current picture by decoding the image data in each maximum coding unit based on the information about the coded depth and the encoding mode according to the maximum coding units. In other words, the image data decoder decoder 230 may decode the encoded image data based on the partition type, the prediction mode, and the transformation unit for each coding unit from among the coding units having the tree structure included in each maximum coding unit. A decoding process may include prediction including intra prediction and motion compensation, and inverse frequency transformation.

The image data decoder 230 may perform intra prediction or motion compensation according to a partition and a prediction mode of each coding unit based on the information about the partition type and the prediction mode of the prediction unit of the coding unit according to coded depths.

Also, the image data decoder 230 may perform inverse frequency transformation according to each transformation unit in the coding unit, based on the information about the size of the transformation unit of the coding unit according to coded depths, so as to perform the inverse frequency transformation according to maximum coding units.

The image data decoder 230 may determine a coded depth of a current maximum coding unit by using split information according to depths. If the split information indicates that image data is no longer split in the current depth, the current depth is a coded depth. Accordingly, the image data decoder 230 may decode a coding unit of the current depth by using the information about the partition type of the prediction unit, the prediction mode, and the size of the transformation unit for image data of the current maximum coding unit.

In other words, data units containing the encoding information including the same split information may be gathered by observing the encoding information set assigned for the predetermined data unit from among the coding unit, the prediction unit, and the minimum unit, and the gathered data units may be considered to be one data unit to be decoded by the image data decoder 230 in the same encoding mode.

The video decoding apparatus 200 according to an exemplary embodiment may obtain information about a coding unit that generates the least encoding error when encoding is recursively performed for each maximum coding unit, and may use the information to decode the current picture. In other words, the coding units having the tree structure determined to be the optimum coding units in each maximum coding unit may be decoded.

Accordingly, even if image data has high resolution and a data amount is large, the image data may be efficiently decoded and restored according to a size of a coding unit and an encoding mode, which are adaptively determined according to characteristics of an image, by using information about an optimum encoding mode received from an encoder.

A method of determining coding units having a tree structure, a prediction unit, and a transformation unit according to an exemplary embodiment will now be described with reference to FIGS. 3 through 13.

Figure 3:
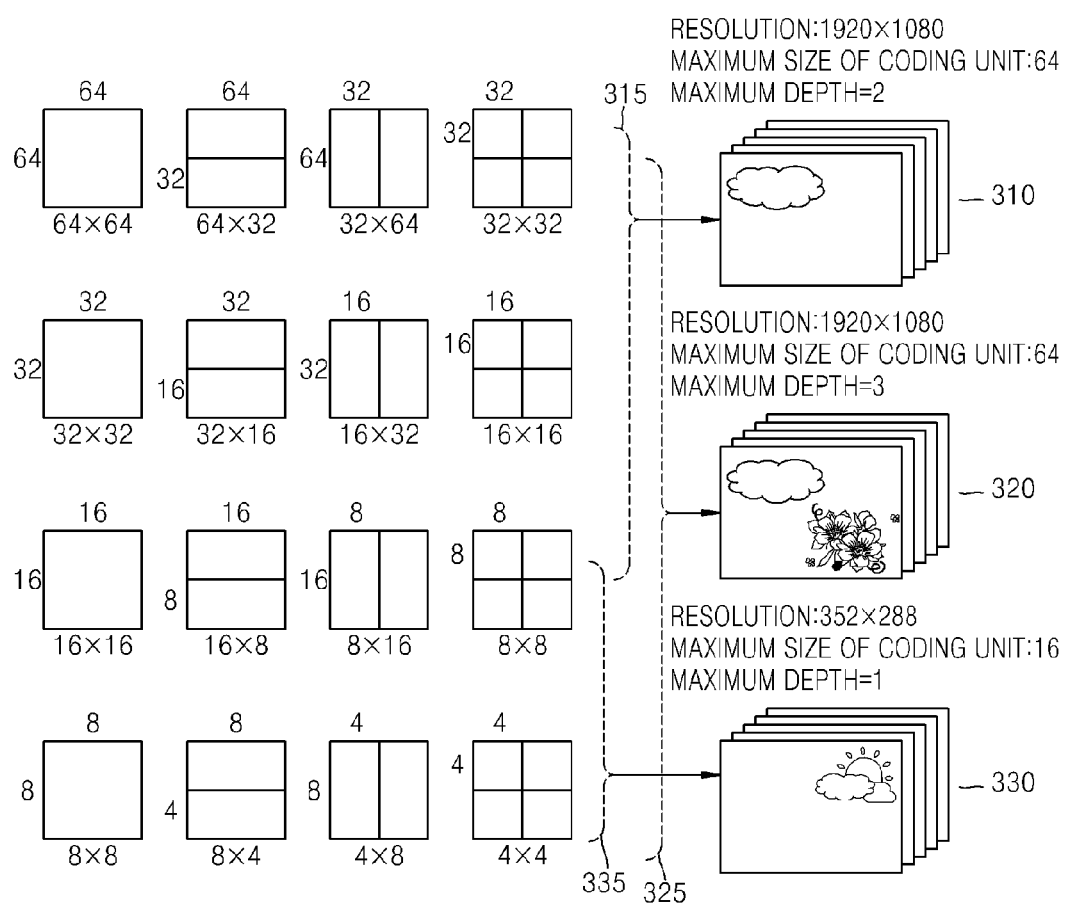
FIG. 3 is a diagram for describing a concept of coding units according to an exemplary embodiment.

FIG. 3 is a diagram for describing a concept of hierarchical coding units according to an exemplary embodiment.

A size of a coding unit may be expressed in width×height, and examples of the size of the coding unit may include 64×64, 32×32, 16×16, and 8×8. A coding unit of 64×64 may be split into partitions of 64×64, 64×32, 32×64, or 32×32, and a coding unit of 32×32 may be split into partitions of 32×32, 32×16, 16×32, or 16×16, a coding unit of 16×16 may be split into partitions of 16×16, 16×8, 8×16, or 8×8, and a coding unit of 8×8 may be split into partitions of 8×8, 8×4, 4×8, or 4×4.

In video data 310, a resolution is set to 1920×1080, a maximum size of a coding unit is set to 64, and a maximum depth is set to 2. In video data 320, a resolution is set to 1920×1080, a maximum size of a coding unit is set to 64, and a maximum depth is set to 3. In video data 330, a resolution is set to 352×288, a maximum size of a coding unit is set to 16, and a maximum depth is set to 1. The maximum depth shown in FIG. 3 denotes a total number of splits from a maximum coding unit to a minimum decoding unit.

If a resolution is high or a data amount is large, a maximum size of a coding unit may be large so as to not only increase encoding efficiency but also to accurately reflect characteristics of an image. Accordingly, the maximum size of the coding unit of the video data 310 and 320 having the higher resolution than the video data 330 may be 64.

Since the maximum depth of the video data 310 is 2, coding units 315 of the video data 310 may include a maximum coding unit having a long axis size of 64, and coding units having long axis sizes of 32 and 16 since depths are increased to two layers by splitting the maximum coding unit twice. Meanwhile, since the maximum depth of the video data 330 is 1, coding units 335 of the video data 330 may include a maximum coding unit having a long axis size of 16, and coding units having a long axis size of 8 since depths are increased to one layer by splitting the maximum coding unit once.

Since the maximum depth of the video data 320 is 3, coding units 325 of the video data 320 may include a maximum coding unit having a long axis size of 64, and coding units having long axis sizes of 32, 16, and 8 since the depths are increased to 3 layers by splitting the maximum coding unit three times. As a depth increases, detailed information may be more precisely expressed.

Figure 4:
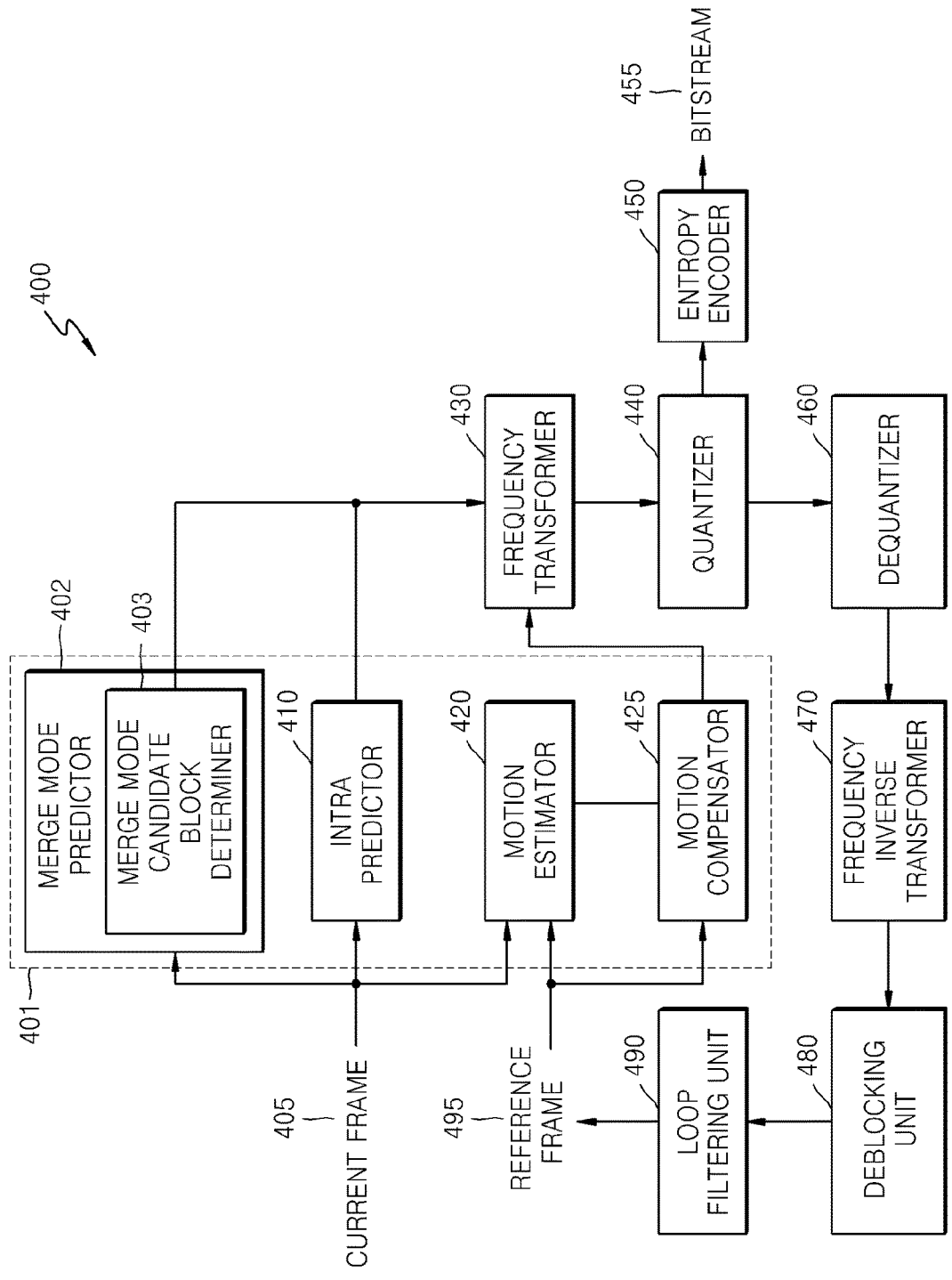
FIG. 4 is a block diagram of an image encoder based on coding units, according to an exemplary embodiment.

FIG. 4 is a block diagram of an image encoder 400 based on coding units, according to an exemplary embodiment.

The image encoder 400 according to an exemplary embodiment performs operations of the coding unit determiner 120 of the video encoding apparatus 100 to encode image data. In other words, an intra predictor 410 performs intra prediction on coding units in an an intra mode, from among a current frame 405, and a motion estimator 420 and a motion compensator 425 perform inter estimation and motion compensation on coding units in an inter mode from among the current frame 405 by using the current frame 405 and a reference frame 495. A merge mode predictor 402 performs prediction according to a merge mode that uses motion information of one block selected from among merge mode candidate blocks that are temporally and spatially related to a current block as motion information of the current block.

Data output from the merge mode predictor 402, the intra predictor 410, the motion estimator 420, and the motion compensator 425 is output as a quantized transformation coefficient through a frequency transformer 430 and a quantizer 440. The quantized transformation coefficient is restored as data in a spatial domain through an inverse quantizer 460 and an inverse frequency transformer 470, and the restored data in the spatial domain is output as the reference frame 495 after being post-processed through a deblocking unit 480 and a loop filtering unit 490. The quantized transformation coefficient may be output as a bitstream 455 through an entropy encoder 450.

In order for the image encoder 400 to be applied in the video encoding apparatus 100 according to an exemplary embodiment, all elements of the image encoder 400, i.e., the merge mode predictor 402, the intra predictor 410, the motion estimator 420, the motion compensator 425, the frequency transformer 430, the quantizer 440, the entropy encoder 450, the inverse quantizer 460, the inverse frequency transformer 470, the deblocking unit 480, and the loop filtering unit 490 have to perform operations based on each coding unit from among coding units having a tree structure while considering the maximum depth of each maximum coding unit.

Specifically, the merge mode predictor 402, the intra predictor 410, the motion estimator 420, and the motion compensator 425 determine partitions and a prediction mode of each coding unit from among the coding units having the tree structure in consideration of the maximum size and the maximum depth of a current maximum coding unit, and the frequency transformer 430 determines the size of the transformation unit in each coding unit from among the coding units having the tree structure.

Figure 5:
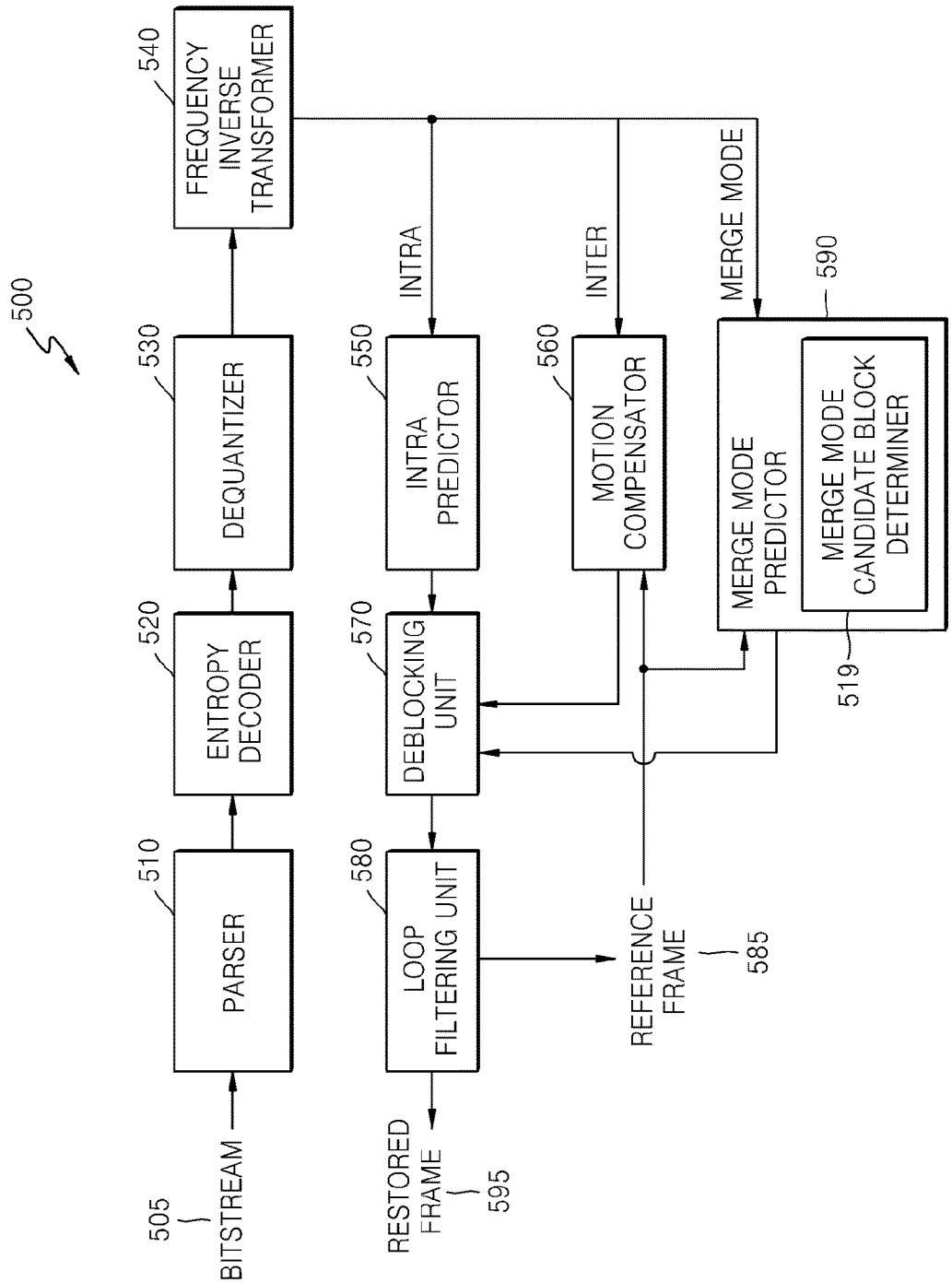
FIG. 5 is a block diagram of an image decoder based on coding units, according to an exemplary embodiment.

FIG. 5 is a block diagram of an image decoder 500 based on coding units, according to an exemplary embodiment.

A parser 510 parses encoded image data to be decoded and information about encoding required for decoding from a bitstream 505. The encoded image data is output as inverse quantized data through an entropy decoder 520 and an inverse quantizer 530, and the inverse quantized data is restored to image data in a spatial domain through an inverse frequency transformer 540.

An intra predictor 550 performs intra prediction on coding units in an intra mode with respect to the image data in the spatial domain, and a motion compensator 560 performs motion compensation on coding units in an inter mode by using a reference frame 585. For a coding unit of a merge mode, a merge mode predictor 590 performs prediction according to a merge mode that generates a prediction value for a current coding unit by using motion information of one coding unit selected from merge mode candidates that are temporally and spatially related to the current coding unit as motion information of a current block.

The data in the spatial domain that passed through the intra predictor 550, the motion compensator 560, and the merge mode predictor 590 may be output as a restored frame 595 after being post-processed through a deblocking unit 570 and a loop filtering unit 580. Also, the data, which is post-processed through the deblocking unit 570 and the loop filtering unit 580, may be output as the reference frame 585.

In order to decode the image data in the image data decoder 230 of the video decoding apparatus 200, the image decoder 500 may perform operations that are performed after operations of the parser 510 are performed.

In order for the image decoder 500 to be applied in the video decoding apparatus 200 according to an exemplary embodiment, all elements of the image decoder 500, i.e., the parser 510, the entropy decoder 520, the inverse quantizer 530, the inverse frequency transformer 540, the intra predictor 550, the motion compensator 560, the deblocking unit 570, the loop filtering unit 580, and the merge mode predictor 590 have to perform operations based on coding units having a tree structure for each maximum coding unit.

Specifically, the intra predictor 550, the motion compensator 560, and the merge mode predictor 590 have to determine partitions and a prediction mode for each of the coding units having the tree structure, and the inverse frequency transformer 540 has to determine a size of a transformation unit for each coding unit.

Figure 6:
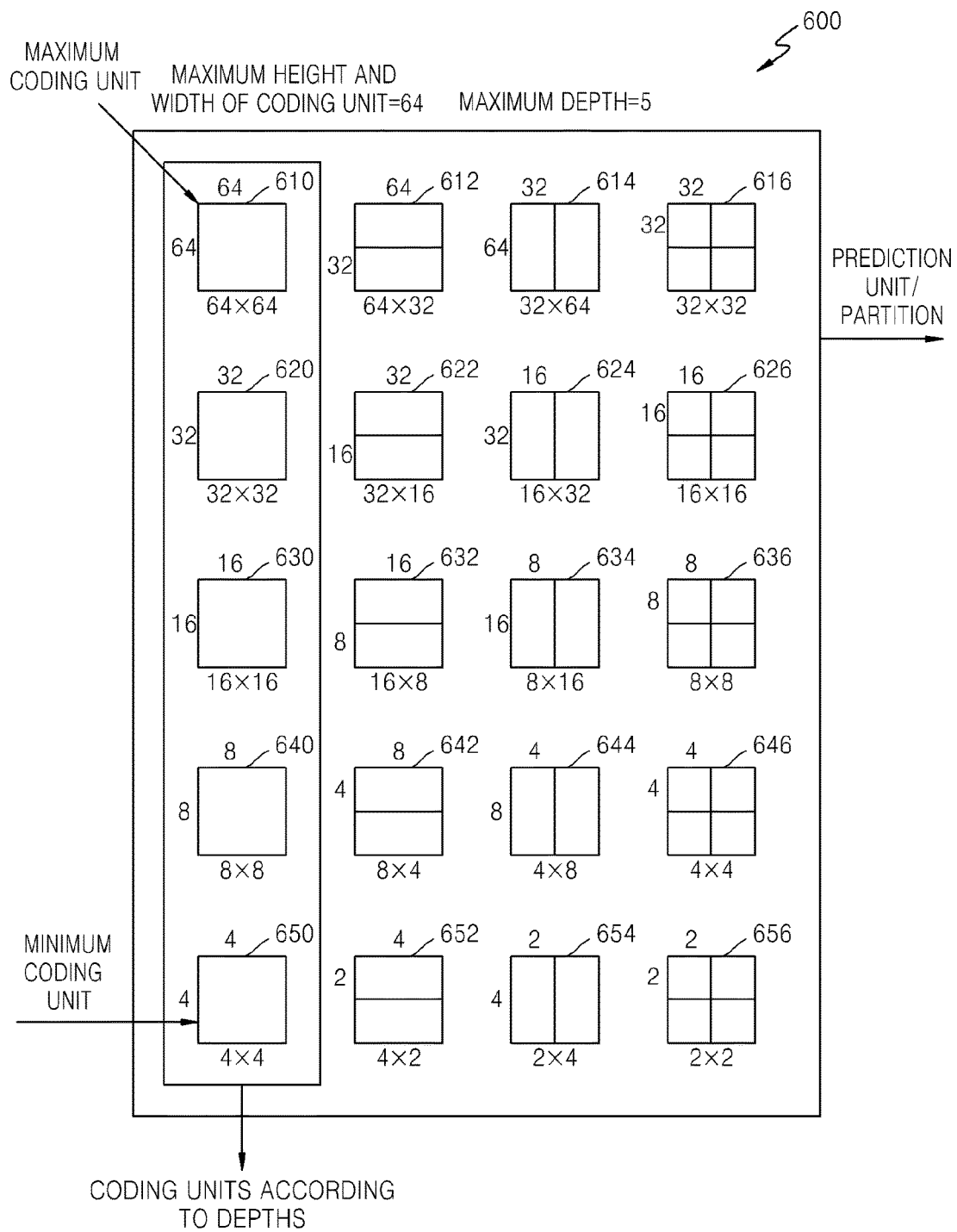
FIG. 6 is a diagram illustrating deeper coding units according to depths and partitions, according to an exemplary embodiment.

FIG. 6 is a diagram illustrating deeper coding units according to depths and partitions, according to an exemplary embodiment.

The video encoding apparatus 100 according to an exemplary embodiment and the video decoding apparatus 200 according to an exemplary embodiment use hierarchical coding units so as to consider characteristics of an image. A maximum height, a maximum width, and a maximum depth of coding units may be adaptively determined according to the characteristics of the image, or may be differently set by a user. Sizes of deeper coding units according to depths may be determined according to the maximum size of the coding unit which is previously set.

In a hierarchical structure 600 of coding units according to an exemplary embodiment, the maximum height and the maximum width of the coding units are each 64, and the maximum depth is 4. Since a depth increases along a vertical axis of the hierarchical structure 600 of the coding units according to an exemplary embodiment, a height and a width of the deeper coding unit are each split. Also, a prediction unit and partitions, which are bases for prediction encoding of each deeper coding unit, are shown along a horizontal axis of the hierarchical structure 600 of the coding units.

In other words, a coding unit 610 is a maximum coding unit in the hierarchical structure 600 of the coding units, wherein a depth is 0 and a size, i.e., a height by width, is 64×64. The depth increases along the vertical axis, and a coding unit 620 having a size of 32×32 and a depth of 1, a coding unit 630 having a size of 16×16 and a depth of 2, a coding unit 640 having a size of 8×8 and a depth of 3, and a coding unit 650 having a size of 4×4 and a depth of 4 exist. The coding unit 650 having the size of 4×4 and the depth of 4 is a minimum coding unit.

The prediction unit and the partitions of a coding unit are arranged along the horizontal axis according to each depth. In other words, if the coding unit 610 having the size of 64×64 and the depth of 0 is a prediction unit, the prediction unit may be split into partitions included in the coding unit 610, i.e., a partition 610 having a size of 64×64, partitions 612 having the size of 64×32, partitions 614 having the size of 32×64, or partitions 616 having the size of 32×32.

Similarly, a prediction unit of the coding unit 620 having the size of 32×32 and the depth of 1 may be split into partitions included in the coding unit 620, i.e., a partition 620 having a size of 32×32, partitions 622 having a size of 32×16, partitions 624 having a size of 16×32, and partitions 626 having a size of 16×16.

Similarly, a prediction unit of the coding unit 630 having the size of 16×16 and the depth of 2 may be split into partitions included in the coding unit 630, i.e., a partition having a size of 16×16 included in the coding unit 630, partitions 632 having a size of 16×8, partitions 634 having a size of 8×16, and partitions 636 having a size of 8×8.

Similarly, a prediction unit of the coding unit 640 having the size of 8×8 and the depth of 3 may be split into partitions included in the coding unit 640, i.e., a partition having a size of 8×8 included in the coding unit 640, partitions 642 having a size of 8×4, partitions 644 having a size of 4×8, and partitions 646 having a size of 4×4.

Finally, the coding unit 650 having the size of 4×4 and the depth of 4 is the minimum coding unit and a coding unit of a lowermost depth. A prediction unit of the coding unit 650 is only assigned to a partition having a size of 4×4.

In order to determine a coded depth of the maximum coding unit 610, the coding unit determiner 120 of the video encoding apparatus 100 according to an exemplary embodiment has to perform encoding for coding units corresponding to each depth included in the maximum coding unit 610.

A number of deeper coding units according to depths including data in the same range and the same size increases as the depth increases. For example, four coding units corresponding to a depth of 2 are required to cover data that is included in one coding unit corresponding to a depth of 1. Accordingly, in order to compare encoding results of the same data according to depths, the coding unit corresponding to the depth of 1 and four coding units corresponding to the depth of 2 have to be each encoded.

In order to perform encoding according to each depth, a representative encoding error that is a least encoding error in the corresponding depth may be selected by performing encoding for each prediction unit in the deeper coding units along the horizontal axis of the hierarchical structure 600 of the coding units. Alternatively, the least encoding error may be searched for by comparing representative encoding errors according to depths by performing encoding for each depth as the depth increases along the vertical axis of the hierarchical structure 600 of the coding units. A depth and a partition having the least encoding error in the maximum maximum coding unit 610 may be selected as the coded depth and a partition type of the maximum coding unit 610.

FIG. 7 is a diagram for describing a relationship between a coding unit 710 and transformation units 720, according to an exemplary embodiment.

The video encoding apparatus 100 according to an exemplary embodiment or the video decoding apparatus 200 according to an exemplary embodiment encodes or decodes an image according to coding units having sizes smaller than or equal to a maximum coding unit for each maximum coding unit. Sizes of transformation units for frequency transformation during encoding may be selected based on data units that are not larger than a corresponding coding unit.

For example, in the video encoding apparatus 100 according to an exemplary embodiment or the video decoding apparatus 200 according to an exemplary embodiment, if a size of the current coding unit 710 is 64×64, frequency transformation may be performed by using the transformation units 720 having a size of 32×32.

Also, data of the coding unit 710 having the size of 64×64 may be encoded by performing the frequency transformation on each of the transformation units having the size of 32×32, 16×16, 8×8, and 4×4, which are smaller than 64×64, and then a transformation unit having a least error may be selected.

FIG. 8 is a diagram for describing encoding information of coding units corresponding to a coded depth, according to an exemplary embodiment.

The output unit 130 of the video encoding apparatus 100 according to an exemplary embodiment may encode and transmit information 800 about a partition type, information 810 about a prediction mode, and information 820 about a size of a transformation unit for each coding unit corresponding to a coded depth, as information about an encoding mode.

The information 800 about the partition type indicates information about a shape of a partition obtained by splitting a prediction unit of a current coding unit, wherein the partition is a data unit for prediction encoding the current coding unit. For example, a current coding unit CU_0 having a size of 2N×2N may be split into any one of a partition 802 having a size of 2N×2N, a partition 804 having a size of 2N×N, a partition 806 having a size of N×2N, and a partition 808 having a size of N×N. Here, the information 800 about the partition type of the current coding unit is set to indicate one of the partition 804 having a size of 2N×N, the partition 806 having a size of N×2N, and the partition 808 having a size of N×N The information 810 about the prediction mode indicates a prediction mode of each partition. For example, the information 810 about the prediction mode may indicate a mode of prediction encoding performed on a partition indicated by the information 800, i.e., an intra mode 812, an inter mode 814, or a skip mode 816.

Also, the information 820 about the size of the transformation unit indicates a transformation unit to be used when the frequency transformation is performed on a current coding unit. For example, the transformation unit may be a first intra transformation unit 822, a second intra transformation unit 824, a first inter transformation unit 826, or a second intra transformation unit 828.

Figure 9:
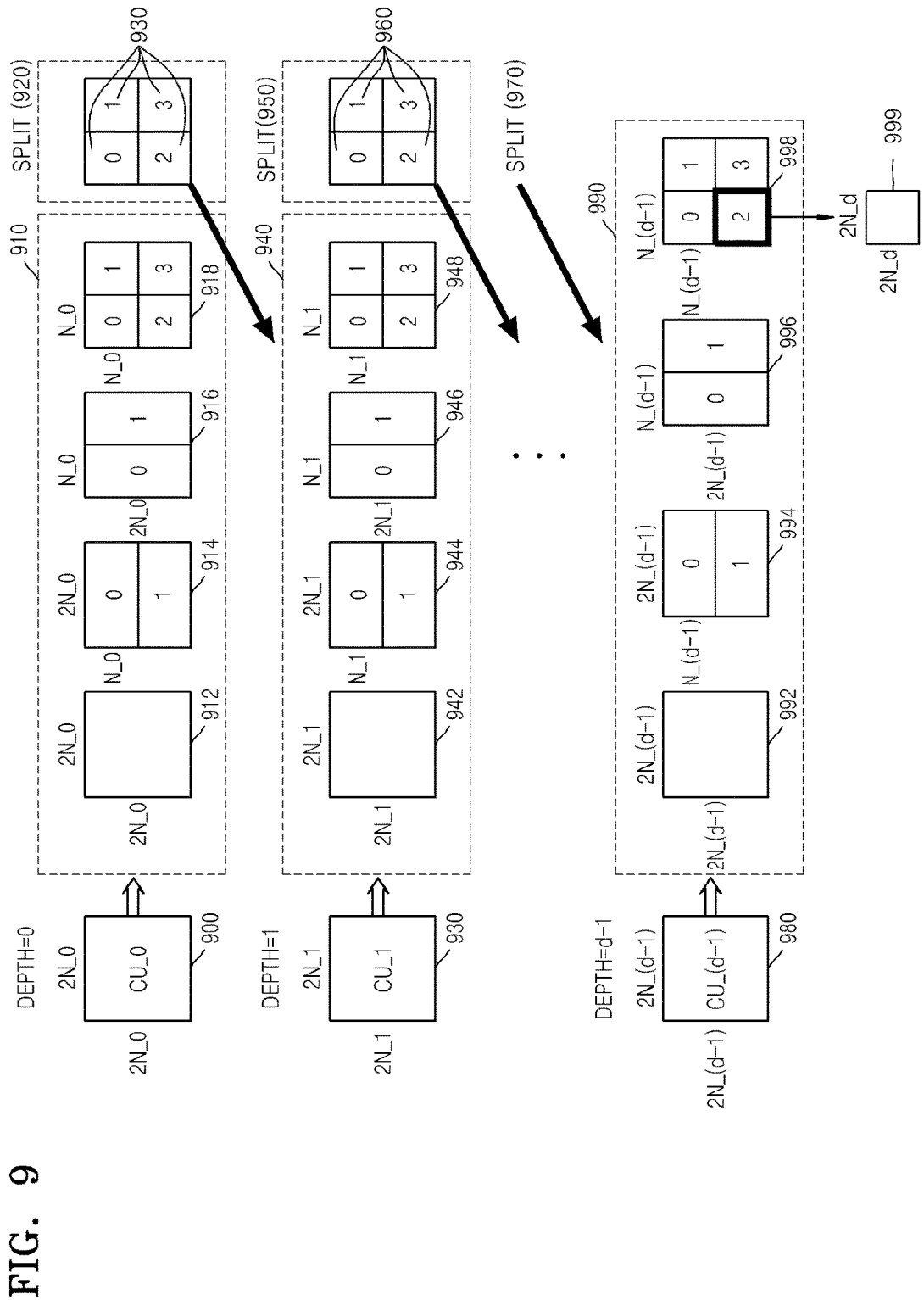
FIG. 9 is a diagram of deeper coding units according to depths, according to an exemplary embodiment.

The image data and encoding information extractor 220 of the video decoding apparatus 200 according to an exemplary embodiment may extract and use the information 800 about the partition type, the information 810 about the prediction mode, and the information 820 about the size of the transformation unit for decoding according to each deeper coding unit FIG. 9 is a diagram of deeper coding units according to depths, according to an exemplary embodiment.

Split information may be used to indicate a change of a depth. The spilt information indicates whether a coding unit of a current depth is split into coding units of a lower depth.

A prediction unit 910 for prediction encoding a coding unit 900 having a depth of 0 and a size of 2N_0×2N_0 may include partitions of a partition type 912 having a size of 2N_0×2N_0, a partition type 914 having a size of 2N_0× N_0, a partition type 916 having a size of N_0×2N_0, and a partition type 918 having a size of N_0×N_0. FIG. 9 only illustrates the partition types 912 through 918 which are obtained by symmetrically splitting the prediction unit 910, but a partition type is not limited thereto. Also, the partitions of the prediction unit 910 may include asymmetrical partitions, partitions having a predetermined shape, and partitions having a geometrical shape.

Prediction encoding has to be repeatedly performed on one partition having a size of 2N_0×2N_0, two partitions having a size of 2N_0×N_0, two partitions having a size of N_0×2N_0, and four partitions having a size of N_0×N_0, according to each partition type. The prediction encoding in an intra mode and an inter mode may be performed on the partitions having the sizes of 2N_0×2N_0, N_0×2N_0, 2N_0×N_0, and N_0×N_0. The prediction encoding in a skip mode may be performed only on the partition having the size of 2N_0×2N_0.

If an encoding error is smallest in one of the partition types 912 through 916 having the sizes of 2N_0×2N_0, 2N_0×N_0, and N_0×2N_0, the prediction unit 910 may be no longer split to a lower depth.

If the encoding error is the smallest in the partition type 918 having the size of N_0×N_0, a depth may be changed from 0 to 1 to split the partition type 918 in operation 920, and encoding may be repeatedly performed on coding units 930 having a depth of 2 and a size of N_0×N_0 to search for a least encoding error.

A prediction unit 940 for prediction encoding the coding unit 930 having a depth of 1 and a size of 2N_1×2N_1 (=N_0×N_0) may include partitions of a partition type 942 having a size of 2N_1×2N_1, a partition type 944 having a size of 2N_1×1×N_1, a partition type 946 having a size of N_1×2N_1, and a partition type 948 having a size of N_1×1×N_1.

If an encoding error is the smallest in the partition type 948 having the size of N_1×N_1, a depth may be changed from 1 to 2 to split the partition type 948 in operation 950, and encoding may be repeatedly performed on coding units 960, which have a depth of 2 and a size of N_2×N_2 to search for a least encoding error.

When a maximum depth is d, split information according to each depth may be set until a depth becomes d−1, and split information may be set until a depth becomes d−2. In other words, when encoding is performed until the depth is d−1 after a coding unit corresponding to a depth of d−2 is split in operation 970, a prediction unit 990 for prediction encoding a coding unit 980 having a depth of d−1 and a size of 2N_(d−1)×2N_(d−1) may include partitions of a partition type 992 having a size of 2N_(d−1)×2N_(d−1), a partition type 994 having a size of 2N_(d−1)×N_(d−1), a partition type 996 having a size of N_(d−1)×2N_(d−1), and a partition type 998 having a size of N_(d−1)×N_(d−1).

Prediction encoding may be repeatedly performed on one partition having a size of 2N_(d−1)×2N_(d−1), two partitions having a size of 2N_(d−1)×N_(d−1), two partitions having a size of N_(d−1)×2N_(d−1), four partitions having a size of N_(d−1)×N_(d−1) from among the partition types to search for a partition type having a least encoding error.

Even when the partition type 998 having the size of N_(d−1)×N_(d−1) has the least encoding error, since a maximum depth is d, a coding unit CU_(d−1) having a depth of d−1 may be no longer split to a lower depth, a coded depth for a current maximum coding unit 900 may be determined to be d−1, and a partition type of the current maximum coding unit 900 may be determined to be N_(d−1)×N_(d−1). Also, since the maximum depth is d, split information for a coding unit 952 having a depth of d−1 is not set.

A data unit 999 may be referred to as a 'minimum unit' for the current maximum coding unit. A minimum unit according to an exemplary embodiment may be a rectangular data unit obtained by splitting a minimum coding unit having a lowermost coded depth by 4. By performing the encoding repeatedly, the video encoding apparatus 100 may select a depth having a least encoding error by comparing encoding errors according to depths of the coding unit 900 to determine a coded depth, and may set a corresponding partition type and a prediction mode as an encoding mode of the coded depth.

As such, the least encoding errors according to depths are compared in all of the depths of 1 through d, and a depth having the least encoding error may be determined as a coded depth. The coded depth, the partition type of the prediction unit, and the prediction mode may be encoded and transmitted as information about an encoding mode. Also, since a coding unit has to be split from a depth of 0 to the coded depth, only split information of the coded depth has to be set to 0, and split information of depths excluding the coded depth has to be set to 1.

The image data and encoding information extractor 220 of the video decoding apparatus 200 according to an exemplary embodiment may extract and use the information about the coded depth and the prediction unit of the coding unit 900 to decode the coding unit 912. According to an exemplary embodiment, the video decoding apparatus 200 may determine a depth in which split information is 0 as a coded depth by using split information according to depths, and may use information about an encoding mode of the corresponding depth for decoding.

Figure 10:
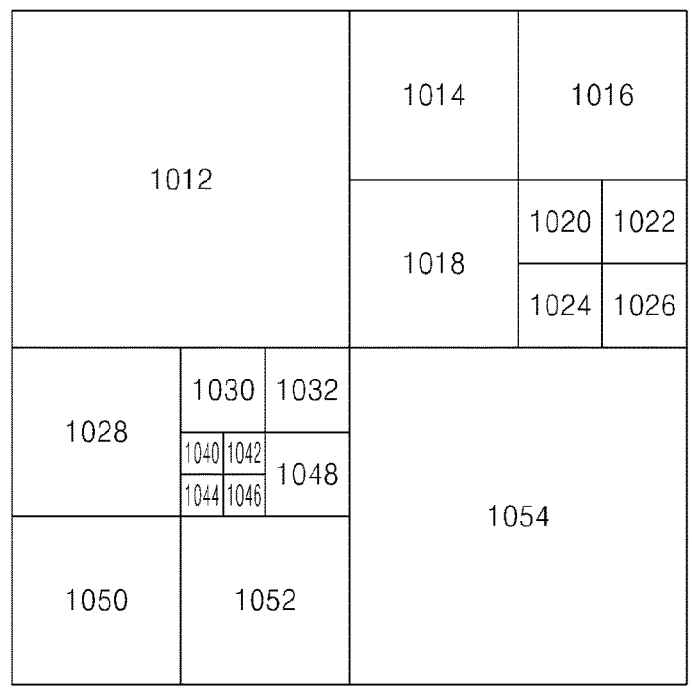
FIGS. 10 through 12 are diagrams for describing a relationship between coding units, prediction units, and frequency transformation units, according to an exemplary embodiment.
Figure 11:
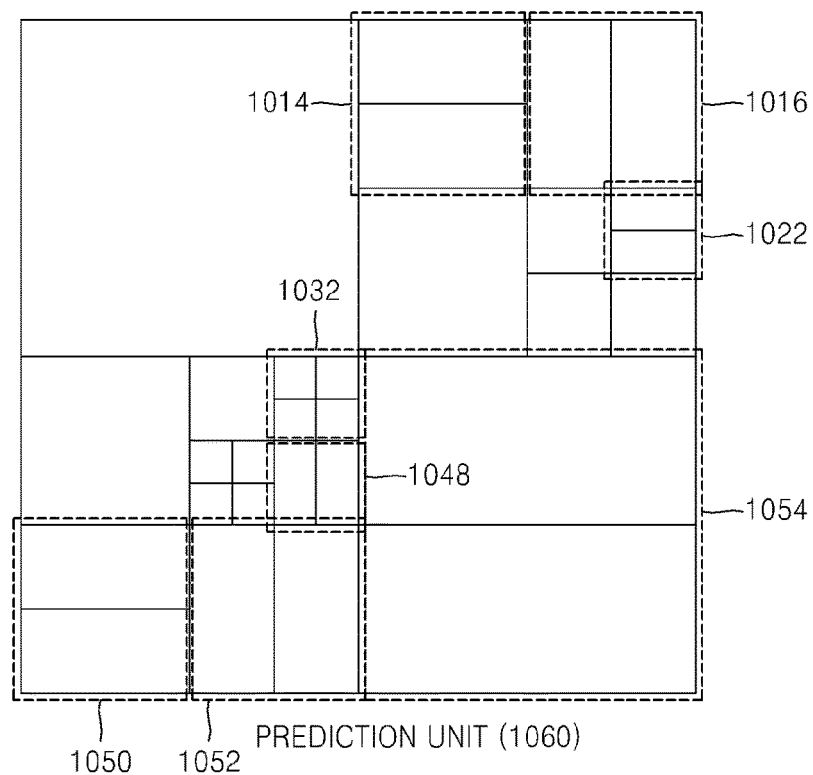
Figure 12:
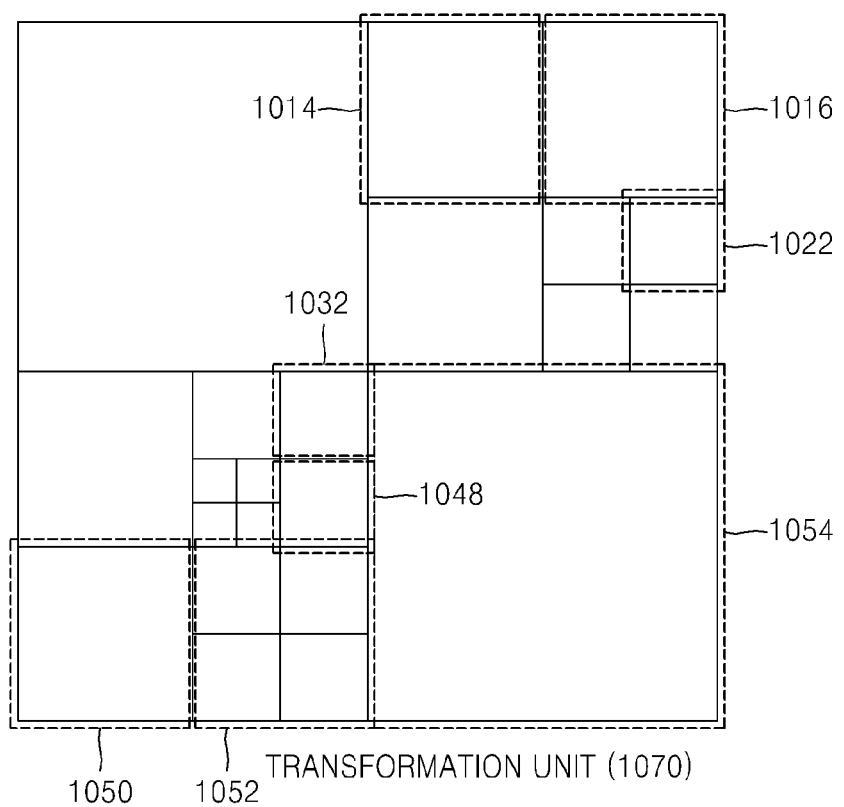

FIGS. 10 through 12 are diagrams for describing a relationship between coding units 1010, prediction units 1060, and frequency transformation units 1070, according to an exemplary embodiment.

The coding units 1010 are coding units corresponding to coded depths determined by the video encoding apparatus 100 according to an exemplary embodiment, in a maximum coding unit. The prediction units 1060 are partitions of prediction units of each of the coding units 1010, and the transformation units 1070 are transformation units of each of the coding units 1010.

When a depth of a maximum coding unit is 0 in the coding units 1010, depths of coding units 1012 and 1054 are 1, depths of coding units 1014, 1016, 1018, 1028, 1050, and 1052 are 2, depths of coding units 1020, 1022, 1024, 1026, 1030, 1032, and 1048 are 3, and depths of coding units 1040, 1042, 1044, and 1046 are 4.

In the prediction units 1060, some partitions 1014, 1016, 1022, 1032, 1048, 1050, 1052, and 1054 are obtained by splitting the coding units. In other words, partition types in the partitions 1014, 1022, 1050, and 1054 have a size of 2N×N, partition types in the partitions 1016, 1048, and 1052 have a size of N×2N, and a partition type of the partition 1032 has a size of N×N. Prediction units and partitions of the coding units 1010 are smaller than or equal to each coding unit.

A frequency transformation or an inverse frequency transformation is performed on image data of the transformation unit 1052 in the transformation units 1070 in a data unit that is smaller than the transformation unit 1052. Also, the transformation units 1014, 1016, 1022, 1032, 1048, 1050, and 1052 in the transformation units 1070 are different from those in the prediction units 1060 in terms of sizes or shapes. In other words, the video encoding apparatus 100 according to an exemplary embodiment and the video decoding apparatus 200 according to an exemplary embodiment may perform intra prediction/motion estimation/motion and frequency transformation/inverse frequency transformation individually on a data unit even in the same coding unit.

Accordingly, encoding may be recursively performed on each of coding units having a hierarchical structure in each region of a maximum coding unit to determine an optimum coding unit, and thus coding units having a recursive tree structure may be obtained. Encoding information may include split information about a coding unit, information about a partition type, information about a prediction mode, and information about a size of a transformation unit. Table 1 shows the encoding information that may be set by the video encoding apparatus 100 according to an exemplary embodiment and the video decoding apparatus 200 according to an exemplary embodiment.

TABLE 1

| | Split Information 0 (Encoding on Coding Unit having Size of 2N × 2N and Current Depth of d) | | | | Split Information 1 |
|---|---|---|---|---|---|
| Prediction Mode | Partition Type | | Size of Transformation Unit | | Repeatedly Encode Coding Units having Lower Depth of d + 1 |
| Intra Inter Skip (Only 2N × 2N) | Symmetrical Partition Type | Asymmetrical Partition Type | Split Information 0 of Transformation Unit | Split Information 1 of Transformation Unit | |
| | 2N × 2N 2N × N | 2N × nU 2N × nD | 2N × 2N | N × N (Symmetrical | |

TABLE 1-continued

| Split Information 0 (Encoding on Coding Unit having Size of 2N × 2N and Current Depth of d) | | | Split Information 1 |
|---|---|---|---|
| N × 2N<br>N × N | nL × 2N<br>nR × 2N | Partition<br>Type)<br>N/2 × N/2<br>(Asymmetrical<br>Partition<br>Type) | |

The output unit 130 of the video encoding apparatus 100 according to an exemplary embodiment may output the encoding information about the coding units having the tree structure, and the image data and encoding information extractor 220 of the video decoding apparatus 200 according to an exemplary embodiment may extract the encoding information about the coding units having the tree structure from a received bitstream.

Split information indicates whether a current coding unit is split into coding units of a lower depth. If split information of a current depth d is 0, a depth, in which a current coding unit is no longer split to a lower depth, is a coded depth, and thus information about a partition type, a prediction mode, and a size of a transformation unit may be defined for the coded depth. If the current coding unit is further split according to the split information, encoding has to be independently performed on four split coding units of a lower depth.

A prediction mode may be one of an intra mode, an inter mode, and a skip mode. The intra mode and the inter mode may be defined in all partition types, and the skip mode may be defined only in a partition type having a size of 2N×2N.

The information about the partition type may indicate symmetrical partition types having sizes of 2N×2N, 2N×N, N×2N, and N×N, which are obtained by symmetrically splitting a height or a width of a prediction unit, and asymmetrical partition types having sizes of 2N×nU, 2N×nD, nL×2N, and nR×2N, which are obtained by asymmetrically splitting the height or width of the prediction unit. The asymmetrical partition types having the sizes of 2N×nU and 2N×nD are respectively obtained by splitting the height of the prediction unit in 1:3 and 3:1, and the asymmetrical partition types having the sizes of nL×2N and nR×2N are respectively obtained by splitting the width of the prediction unit in 1:3 and 3:1

The size of the transformation unit may be set to be two types in the intra mode and two types in the inter mode. In other words, if split information of the transformation unit is 0, the size of the transformation unit is set to 2N×2N, which is the size of the current coding unit. If split information of the transformation unit is 1, the transformation units may be obtained by splitting the current coding unit. Also, if a partition type of the current coding unit having the size of 2N×2N is a symmetrical partition type, a size of a transformation unit may be set to N×N, and if the partition type of the current coding unit is an asymmetrical partition type, the size of the transformation unit may be set to N/2×N/2.

The encoding information about coding units having a tree structure according to an exemplary embodiment may be assigned to at least one of a coding unit corresponding to a coded depth, a prediction unit, and a minimum unit. The coding unit corresponding to the coded depth may include at least one of a prediction unit and a minimum unit containing the same encoding information.

Accordingly, it is determined whether adjacent data units are included in the same coding unit corresponding to the coded depth by comparing encoding information of the adjacent data units. Also, a corresponding coding unit corresponding to a coded depth may be determined by using encoding information of a data unit, and thus a distribution of coded depths in a maximum coding unit may be determined.

Accordingly, if a current coding unit is predicted by referring to adjacent data units, encoding information of data units in deeper coding units adjacent to the current coding unit may be directly referred to and used.

Alternatively, if a current coding unit is prediction encoded by referring to adjacent data units, data units adjacent to the current coding unit in deeper coding units may be searched for by using encoded information of the data units, and the searched adjacent coding units may be referred to for prediction encoding the current coding unit.

Figure 13:
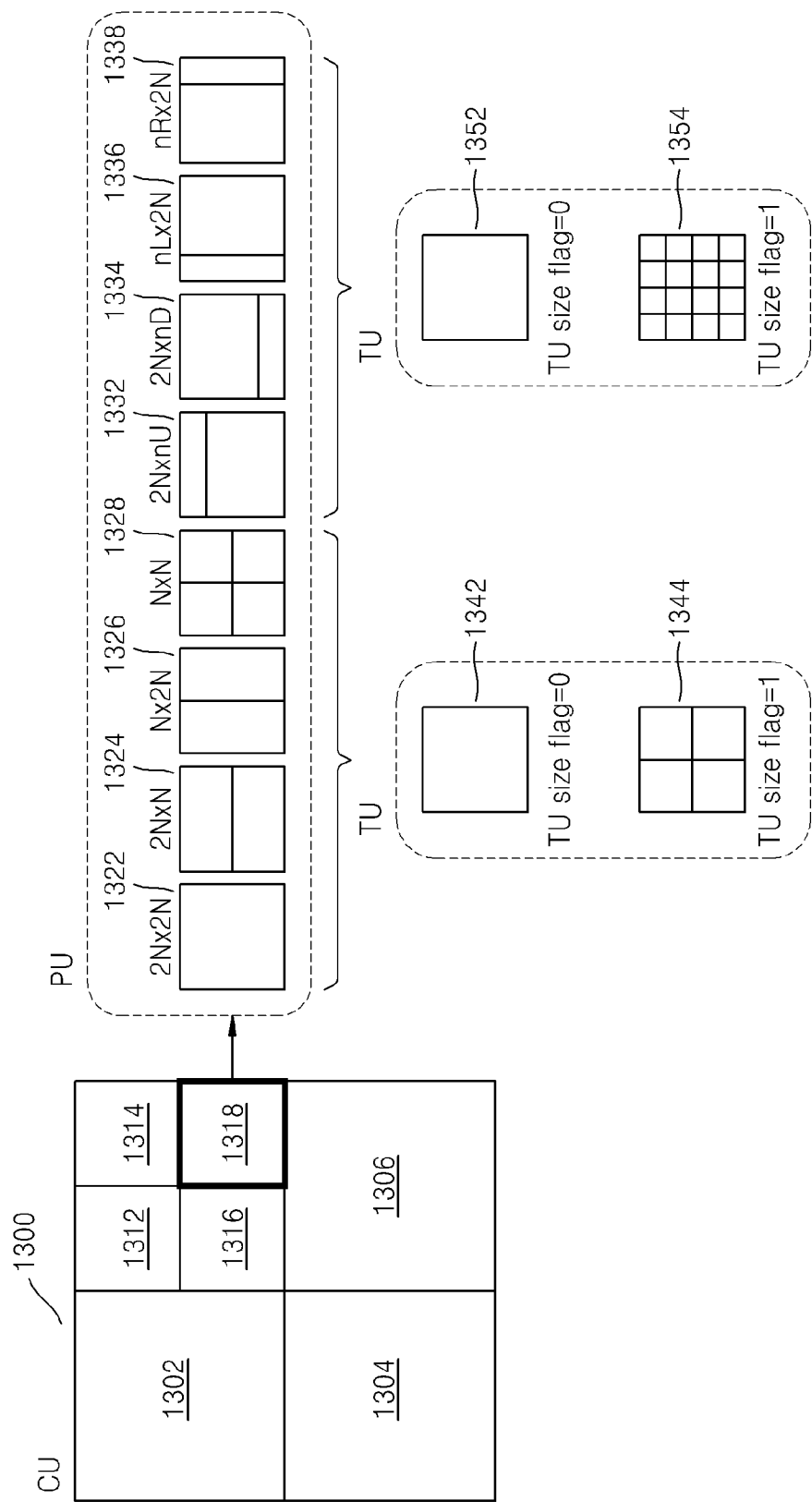
FIG. 13 is a diagram for describing a relationship between a coding unit, a prediction unit, and a transformation unit according to encoding mode information of Table 1.

FIG. 13 is a diagram for describing a relationship between a coding unit, a prediction unit, and a transformation unit according to the encoding mode information of Table 1.

A maximum coding unit 1300 includes coding units 1302, 1304, 1306, 1312, 1314, 1316, and 1318 of coded depths. Here, since the coding unit 1318 is a coding unit of a coded depth, split information may be set to 0. Information about a partition type of the coding unit 1318 having a size of 2N×2N may be set to be one of a partition type 1322 having a size of 2N×2N, a partition type 1324 having a size of 2N×N, a partition type 1326 having a size of N×2N, a partition type 1328 having a size of N×N, a partition type 1332 having a size of 2N×nU, a partition type 1334 having a size of 2N×nD, a partition type 1336 having a size of nL×2N, and a partition type 1338 having a size of nR×2N.

When the partition type is set to be symmetrical, i.e., the partition type 1322 having the size of 2N×2N, 1324 having the size of 2N×N, 1326 having the size of N×2N, or 1328 having the size of N×N, a transformation unit 1342 having a size of 2N×2N may be set if split information (TU size flag) of a transformation unit is 0, and a transformation unit 1344 having a size of N×N may be set if a TU size flag is 1.

When the partition type is set to be asymmetrical, i.e., the partition type 1332 having the size of 2N×nU, 1334 having the size of 2N×nD, 1336 having the size of nL×2N, or 1338 having the size of nR×2N, a transformation unit 1352 having a size of 2N×2N may be set if a TU size flag is 0, and a transformation unit 1354 having a size of N/2×N/2 may be set if a TU size flag is 1.

A bidirectional motion estimation process performed by a motion estimator 420 and a motion compensator 425 of an image encoding apparatus 400 according to an exemplary embodiment of FIG. 4 and a motion compensator 560 of an image decoding apparatus 500 of FIG. 5, and a block merging process performed by a merge mode predictor 402 of the image encoding apparatus 400 of FIG. 4 and a merge mode predictor 590 of the image decoding apparatus 500 of FIG. 5 will now be explained in detail.

In exemplary embodiments, a slice encoded by using unidirectional prediction during inter prediction is referred to as a P slice, and a slice encoded by using bidirectional prediction during the inter prediction is referred to as a B slice. When bidirectional prediction is used, a block may have up to two pieces of motion information (motion vectors, reference pictures). A reference picture is managed by a reference picture list, and a forward reference picture (past image) is generally assigned to a list 0 (hereinafter, referred to as an "L0") and a backward reference picture (future image) is generally assigned to a list 1 (hereinafter, referred to as an "L1").

According to an exemplary embodiment, in order to improve the performance of inter prediction in a low-delay environment, a generalized P and B (GPB) slice instead of a P slice may be used. The GPB slice may have up to two pieces of motion information per block, like a general B slice. However, in the GPB slice, an L0 reference picture list and an L1 reference picture list have to be always the same, and images stored in a reference picture list have to include only a past image prior to a current image. A case where bidirectional motion estimation of a block included in the GPB slice is limited will now be explained.

Figure 14:
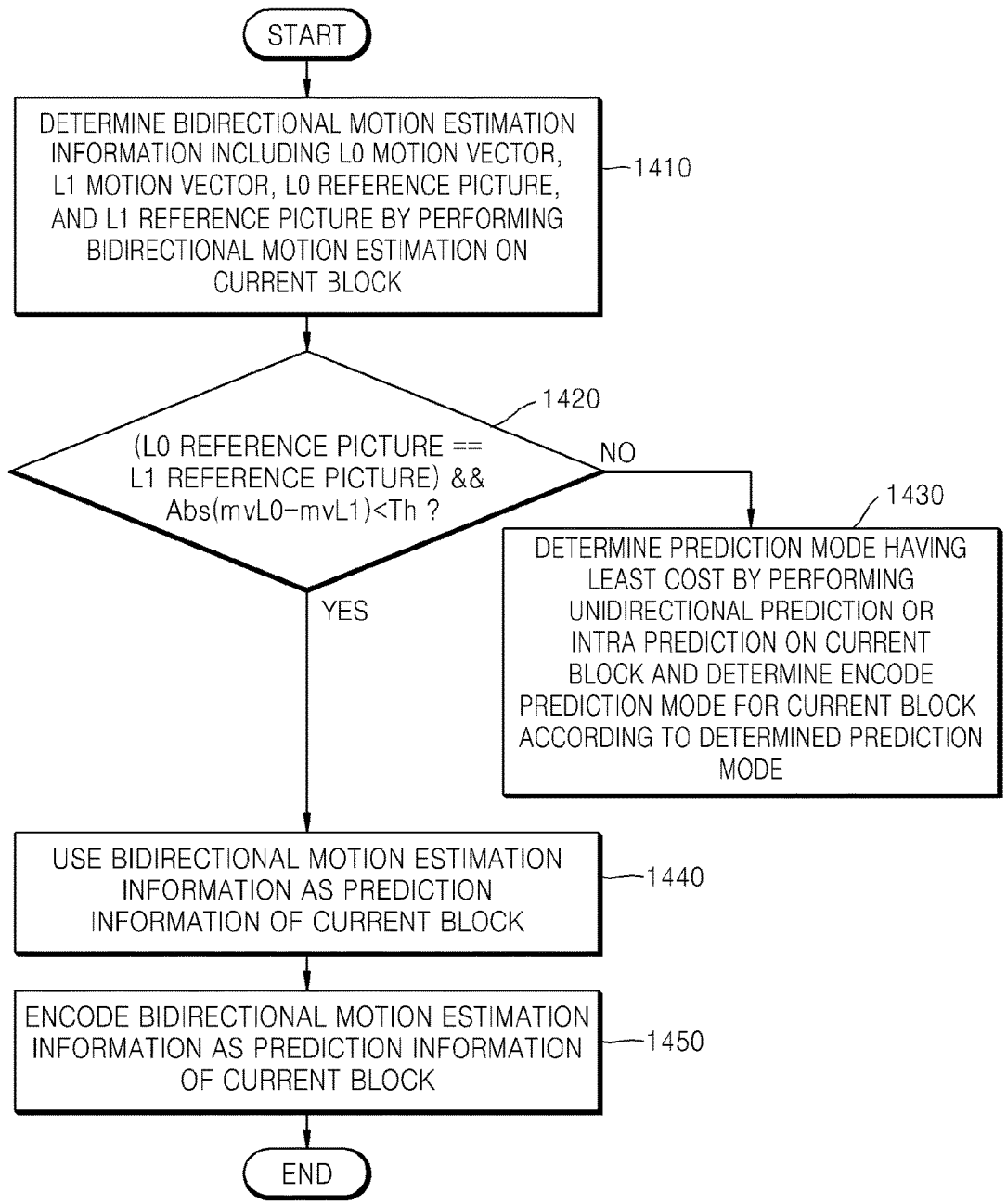
FIG. 14 is a flowchart illustrating a method of encoding an image, according to an exemplary embodiment.

FIG. 14 is a flowchart illustrating a method of encoding an image, according to an exemplary embodiment.

Referring to FIGS. 4 and 14, in operation 1410, the motion estimator 420 determines bidirectional motion estimation information including an L0 motion vector, an L1 motion vector, an L0 reference picture for a current block, and an L1 reference picture by performing bidirectional motion estimation on the current block.

Figure 15:
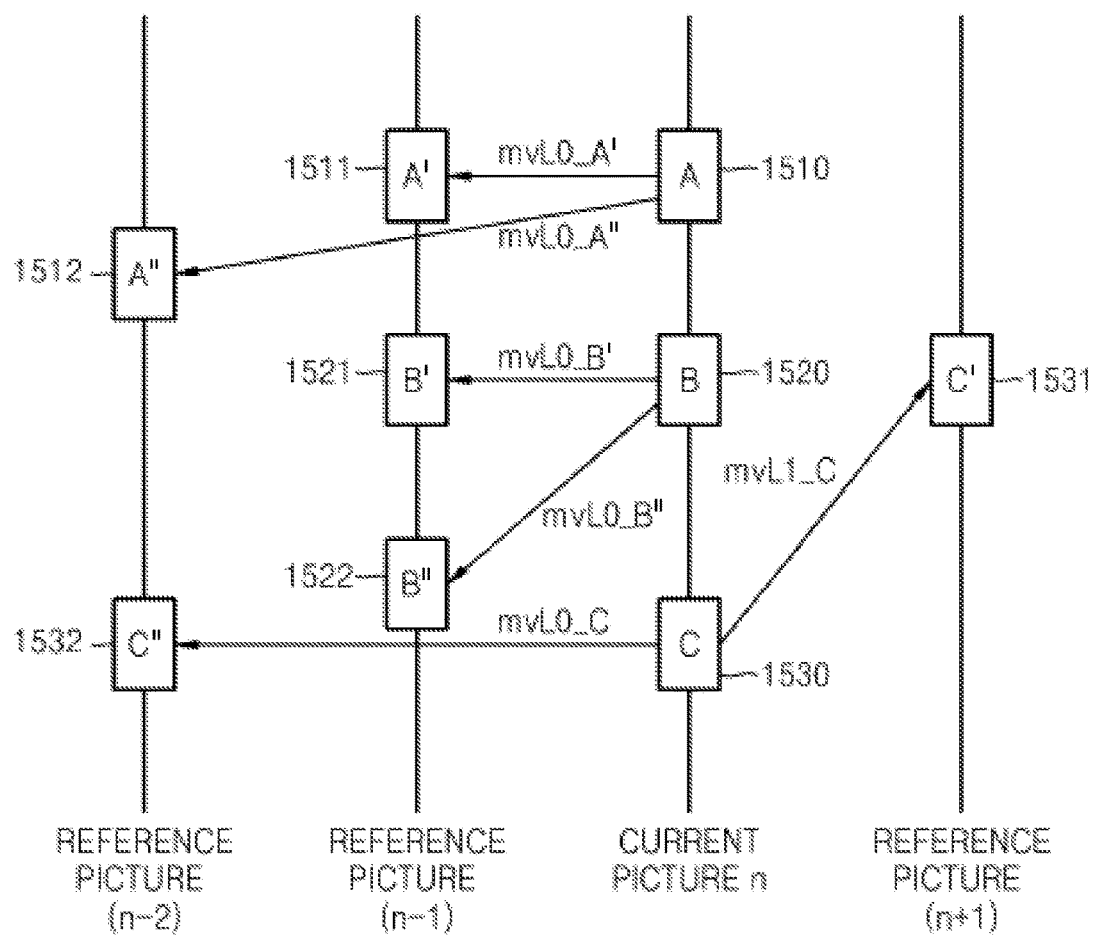
FIG. 15 is a diagram illustrating a result of bidirectional motion estimation performed on blocks of a current picture, according to an exemplary embodiment.

FIG. 15 is a diagram illustrating a result of bidirectional motion estimation performed on blocks of a current picture, according to an exemplary embodiment.

Referring to FIG. 15, a bidirectional motion estimated block may have two pieces of motion information. The two pieces of motion information according to bidirectional motion estimation may be roughly divided into i) two pieces of motion information that refer to different reference pictures in an L0 direction, ii) two pieces of motion information that refer to a same reference picture in the L0 direction or an L1 direction, and iii) two pieces of motion information that respectively refer to one reference picture in the L0 direction and one reference picture in the L1 direction. As an example of the i) two pieces of motion information that refer to different reference pictures in an L0 direction, a block A 1510 has a mvL0 A' vector that refers to a block A' 1511 of a reference picture n−1 in the L0 direction and a mvL0 A" vector that refers to a block A" 1512 of a reference block n−2 in the L0 direction as motion information. As an example of ii) the two pieces of motion information that refer to a same reference picture in the L0 direction or an L1 direction, a block B 1520 has a mvL0 B' vector that refers to a block B' 1521 of the reference picture n−1 in the L0 direction and a mvL0 B" vector that refers to a block B" 1522 of the reference picture n−1 in the L0 direction as motion information. As an example of iii) the two pieces of motion information that respectively refer to one reference picture in the L0 direction and one reference picture in the L1 direction, a block C 1530 has a mvL1_C vector that refers to a block C' 1531 of a reference picture n+1 in the L1 direction and a mvL0_C vector that refers to a block C" 1532 of the reference picture n−2 in the L0 direction as motion information.

The block B 1520 from among bidirectional motion estimated blocks of FIG. 15 is prediction encoded by referring to the two blocks B' 1521 and the block B" 1522 of the same reference picture n−1. As such, for a bidirectional motion estimated block that refers to the same reference picture that is processed temporally earlier than a current picture, when a difference between two motion vectors is large, image compression efficiency is not high enough although computational complexity is high. In other words, when a bidirectional motion estimated block that refers to the same reference picture that is processed temporally earlier than a current picture includes two similar motion vectors, performance may be mostly improved.

Figure 16:
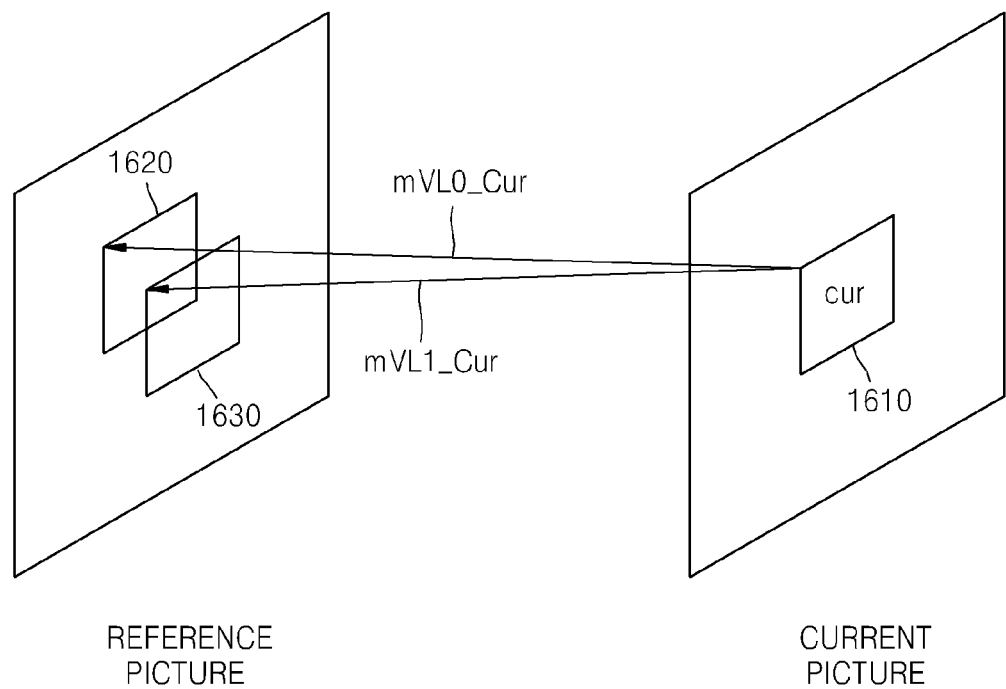
FIG. 16 is a diagram illustrating a bidirectional motion estimated block that refers to the same reference picture, according to an exemplary embodiment.

FIG. 16 is a diagram illustrating a bidirectional motion estimated block that refers to the same reference picture, according to an exemplary embodiment.

Referring to FIG. 16, it is assumed that after bidirectional motion estimation is performed, two motion vectors mvL0_Cur and mvL1_Cur indicating two blocks 1620 and 1630 of the same reference picture are obtained for a current block 1610. The motion estimator 420 according to an exemplary embodiment allows a bidirectional motion estimation mode only when a difference value between the two motion vectors mvL0_cur and mvL1_cur of a bidirectional motion estimation block that refers to the same reference picture is less than a predetermined threshold value. That is, if reference pictures of a bidirectional motion estimated block are the same, a method of encoding an image according to an exemplary embodiment allows only bidirectional motion estimation having a motion vector difference value equal to or less than a predetermined threshold value, and limits bidirectional motion estimation for the corresponding block when the motion vector difference value exceeds the predetermined threshold value.

In detail, referring back to FIG. 14, in operation 1420, the motion estimator 420 determines whether the L0 reference picture and the L1 reference picture obtained after the bidirectional motion estimation are the same. That is, the motion estimator 420 obtains whether the two obtained motion vectors mvL0 and mvL1 indicate the same reference picture. Also, if the two obtained motion vectors mvL0 and mvL1 indicate the same reference picture, the motion estimator 420 determines whether a difference value between the two obtained motion vectors mvL0 and mvL1, that is, mvL0−mvL1, is less than a predetermined threshold value Th. If mvL0=(mvL0x, mvL0y) and mvL1=(mvL1x, mvL1y), the motion estimator 420 may determine whether an absolute value of a difference value between an x-axis component and a y-axis component of the two motion vectors is less than the predetermined threshold value Th, that is, abs(mvL0x−mvL1x)<Th and abs(mvL0y−mvL1t)<Th.

Although the two motion vectors mvL0 and mvL1 of the bidirectional motion estimated current block indicate the same reference picture as a result of the determination in operation 1420, when a difference value, that is mvL0−mvL1, between the two motion vectors mvL0 and mvL1 is equal to or greater than the predetermined threshold value Th, in operation 1430, the current block is not encoded in the bidirectional motion estimation mode but is encoded according to another mode, that is, a prediction mode having a least cost from among a unidirectional motion estimation mode and an intra prediction mode. If the determined L0 reference picture or L1 reference picture is a picture that is processed temporally earlier than a picture including the current block and the L0 reference picture and the L1 reference picture are not the same, the motion estimator 420 may use the bidirectional motion estimation information of the corresponding block itself as prediction information. That is, only when the two motion vectors mvL0 and mvL1 of the bidirectional motion estimated current block indicate the same reference picture that is processed earlier and the difference value, that is, mvL0−mvL1, between the two motion vectors mvL0 and mvL1 is equal to or greater than the predetermined threshold value Th, the motion estimator 420 may limit motion information, and in other cases, the motion estimator 420 may use the determined motion information itself.

If the two motion vectors mvL0 and mvL1 of the bidirectional motion estimated current block indicate the same reference picture and the difference value between the two motion vectors mvL0 and mvL1 is less than the predetermined threshold value Th as a result of the determination in operation 1420, in operation 1440, the bidirectional motion estimation information itself obtained for the current block is determined as motion information of the current block, and in operation 1450, the determined bidirectional motion estimation information of the current block is encoded as motion information of the current block.

Figure 17:
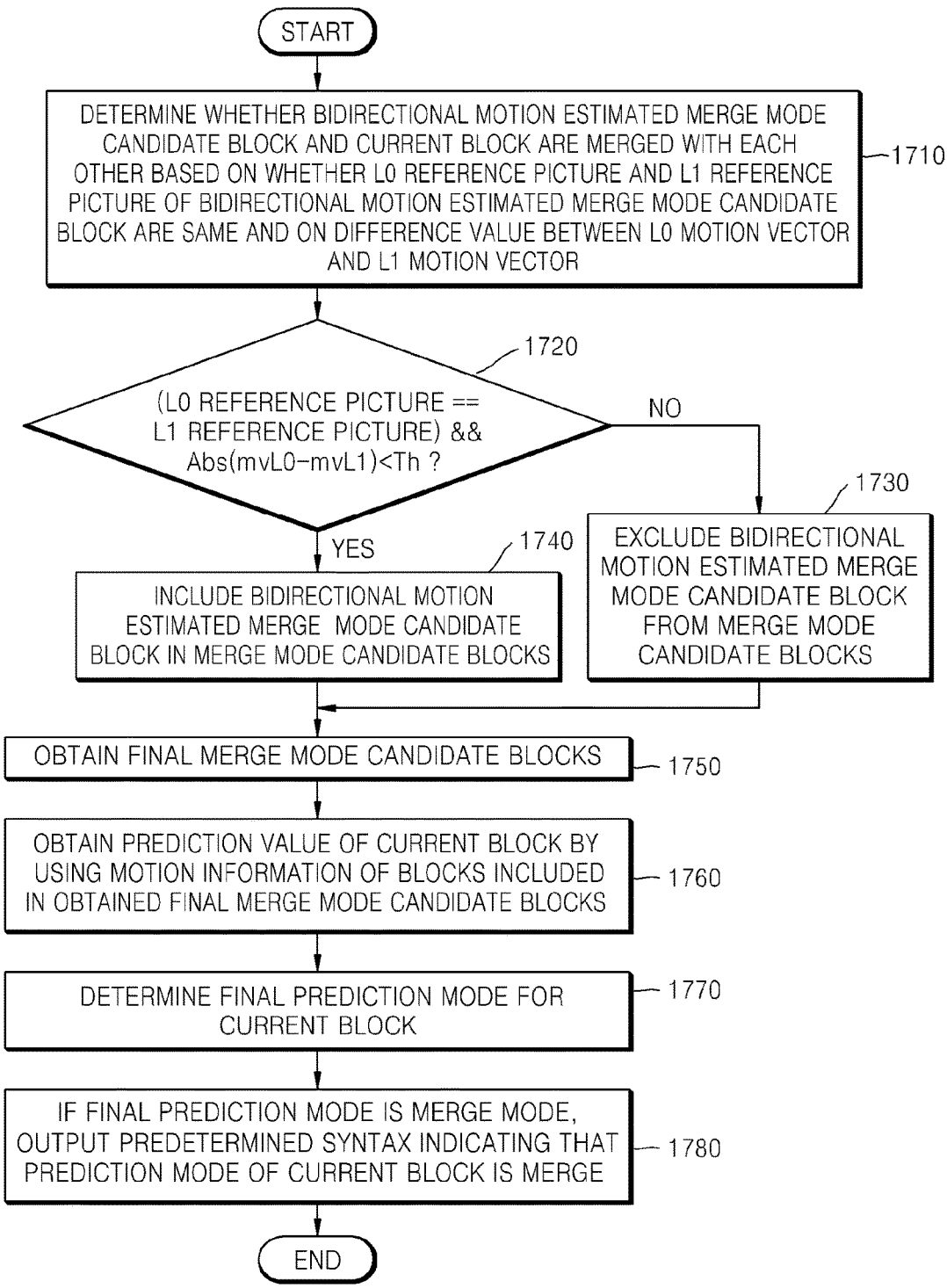
FIG. 17 is a flowchart illustrating a method of encoding an image, according to another exemplary embodiment.

FIG. 17 is a flowchart illustrating a method of encoding an image, according to another exemplary embodiment.

In a merge mode, that is, in a mode in which prediction encoding is performed on a current block by using prediction mode information of a block temporally and spatially related to the current block, the method of encoding an image according to another exemplary embodiment limits block merging when a difference value between two motion vectors of a bidirectional motion estimated block that refers to the same reference picture from among merge mode candidate blocks is greater than a predetermined threshold value.

In detail, referring to FIGS. 4 and 17, in operation 1710, for a bidirectional motion estimated merge mode candidate block from among merge mode candidate blocks that are temporally and spatially related to a current block, the merge mode predictor 402 determines whether the bidirectional motion estimated merge mode candidate block and the current block are merged with each other based on whether an L0 reference picture and an L1 reference picture of the bidirectional motion estimated merge mode candidate block are the same and a difference value between an L0 motion vector and an L1 motion vector. In detail, in operation 1720, the merge mode predictor 402 determines whether the L0 reference picture and the L1 reference picture obtained after bidirectional motion estimation performed on blocks included in the merge mode candidate blocks are the same. Also, the merge mode predictor 402 determines whether a difference value, that is, mvL0−mvL1, between the two motion vectors mvL0 and mvL1 of a block included in the merge mode candidate blocks is less than the predetermined threshold value Th.

If the two motion vectors mvL0 and mvL1 of the bidirectional motion estimated merge mode candidate block do not indicate the same reference picture or the difference value between the two motion vectors mvL0 and mvL1 is equal to or greater than the predetermined threshold value Th as a result of the determination in operation 1720, in operation 1730, the merge mode predictor 402 excludes the corresponding merge mode candidate block from the merge mode candidate blocks. If the two motion vectors mvL0 and mvL1 of the bidirectional motion estimated merge mode candidate block indicate the same reference picture and the difference value between the two motion vectors mvL0 and mvL1 is less than the predetermined threshold value Th as a result of the determination in operation 1720, in operation 1740, the merge mode predictor 402 maintains the bidirectional motion estimated merge mode candidate block in the merge mode candidate blocks.

As such, for a bidirectional motion estimated block having two motion vectors from among the merge mode candidate blocks, final merge mode candidate blocks are obtained by including or excluding the bidirectional motion estimated block in or from the merge mode candidate blocks based on whether two reference pictures are the same and a difference value between the two motion vectors (operation 1750).

In operation 1760, the merge mode predictor 402 obtains a prediction value of the current block by using motion information of blocks included in the obtained final merge mode candidate blocks. In operation 1770, an encoding result according to an intra prediction mode for the current block, an encoding result for inter prediction, and an encoding result according to a merge mode are compared with one another, and a prediction mode having a least encoding error is finally determined as a prediction mode of the current block.

In operation 1780, if a merge mode is determined as the final prediction mode for the current block, the entropy encoder 450 encodes and outputs a predetermined syntax merge_flag indicating that the current block has been predicted according to a merge mode. The syntax merging_flag may be set to 1 when the current block is margined with a neighboring block, and may be set to 0 when the current block is not merged with a neighboring block. Also, the entropy encoder 450 may encode and output merged block index information indicating a candidate block that is merged with the current block from among the plurality of merge mode candidate blocks. If the current block is merged with a neighboring block, encoding data for the current block may include residual data as well as syntax information merging flag. If the residual data is 0, a skip mode may be additionally determined, and a skip flag set to 1 may be included in encoding information of the current block.

Figure 18A:
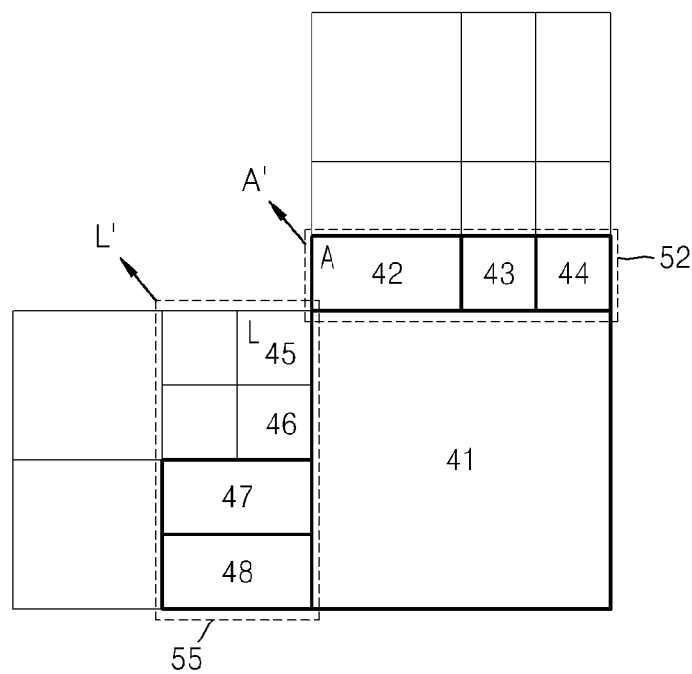
FIGS. 18A and 18B are diagrams illustrating merge mode candidate blocks that are spatially related to a current block, according to an exemplary embodiment.
Figure 18B:
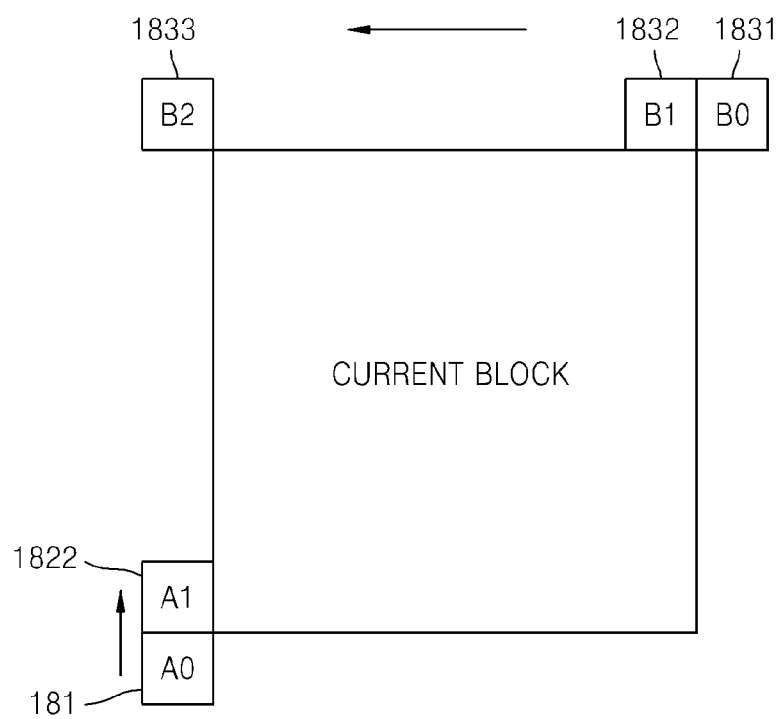

FIGS. 18A and 18B are diagrams illustrating merge mode candidate blocks that are spatially related to a current block, according to an exemplary embodiment.

A merge mode candidate block determiner 403 determines merge mode candidate blocks whose motion information is to be merged with a current block from among blocks that are temporally and spatially related to the current block. In detail, referring to FIG. 18A, the merge mode candidate block determiner 403 may include upper neighboring blocks 42, 43, and 44 and left neighboring blocks 45, 46, 47, and 48 as spatial merge mode candidate blocks that may be merged with a current block 41. Also, the merge mode candidate block determiner 403 may determine only one from among upper merge mode candidate blocks 52 including the upper neighboring blocks 42, 43, and 44 of the current block 41 as an upper merge mode candidate block A'. Likewise, the merge mode candidate block determiner 403 may determine one from among left merge mode candidate blocks 55 including the left neighboring blocks 45, 46, 47, and 48 of the current block 41 as a left merge mode candidate block L'. That is, one candidate block block A' from among the upper neighboring blocks and one candidate block L' from among the left neighboring blocks may be selected. The merge mode candidate block determiner 403 may select one candidate block A' from among the upper neighboring blocks and one candidate block L' from among left neighboring blocks according to a preset method. For example, from among among the upper neighboring blocks 52 and the left neighboring blocks 55, neighboring blocks having the same reference index information as the current block 41 may be determined as merge mode candidate blocks. Alternatively, from among the upper neighboring blocks 52 and the left neighboring blocks 55, adjacent data units, for example, a block A 42 and a block L 45, which are the closest to a left and upper sample of the current block 41 in an inter mode, from among the upper neighboring blocks 52 and the left neighboring blocks 545, may be determined respectively as the upper merge mode candidate block A' and the left merge mode candidate block L'. A process of determining merge mode candidate blocks is not limited thereto and may may be set in various ways.

Referring to FIG. 18B, the merge mode candidate block determiner 403 may determine only some blocks A0 181, A1 1822, B0 1831, B1 1832, and B2 1833 from among neighboring blocks as merge mode candidate blocks, instead of selecting all neighboring blocks around a current block as merge mode candidate blocks as shown in FIG. 18A.

Figure 19:
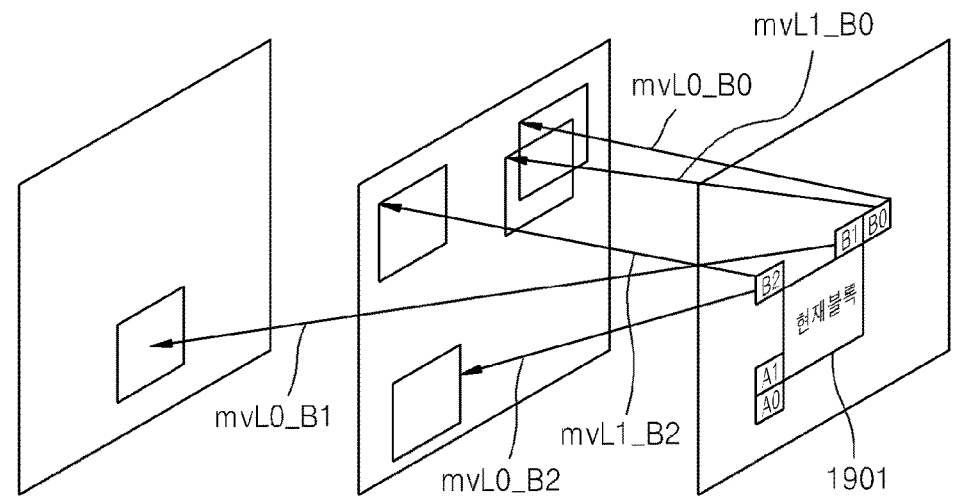
FIG. 19 is a reference diagram for describing a bidirectional motion estimated block whose block merging is limited from among spatial merge mode candidate blocks, according to an exemplary embodiment.

FIG. 19 is a reference diagram for describing a bidirectional motion estimated block whose block merging is limited from among spatial merge mode candidate blocks, according to an exemplary embodiment.

Referring to FIG. 19, it is assumed that blocks B0 and B2 that are spatially related to a current block are bidirectional motion estimated blocks each having two pieces of motion information. The merge mode candidate block determiner 403 obtains a difference value between motion vectors of each of the bidirectional motion estimated blocks B0 and B2. If a difference value between two motion vectors mvL0_B0 and mvL1_B0 of the block B0 that refers to the same reference picture n-1 is less than a predetermined threshold value, the merge mode candidate block determiner 403 includes the block B0 in merge mode candidate blocks. If a difference value between two motion vectors mvL0_B2 and mvL1_B2 of the block B2 that refers to the same reference picture n-1 is greater than the predetermined threshold value, the merge mode candidate block determiner 403 excludes the block B2 from the merge mode candidate blocks.

Figure 20:
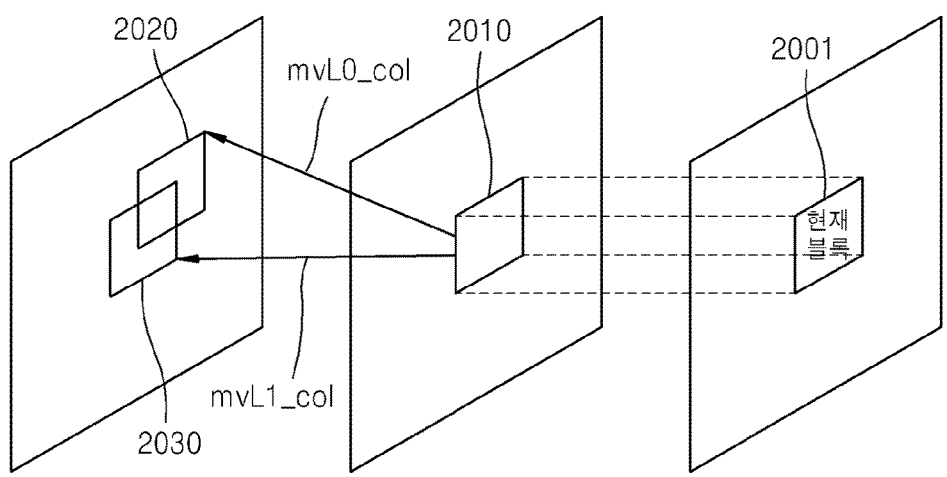
FIG. 20 is a reference diagram for describing a temporal merge mode candidate block according to an exemplary embodiment.

FIG. 20 is a reference diagram for describing a temporal merge mode candidate block according to an exemplary embodiment.

Referring to FIG. 20, the merge mode candidate block determiner 403 may select a block that is temporally related to a current block as a merge mode candidate block. For example, the merge mode candidate block determiner 403 may select a collocated block 2010 that is located at the same position as a current block 2001 in a reference picture n-1 as a merge mode candidate block. In this case, if the collocated block 2010 is a bidirectional motion estimated block, the merge mode candidate block determiner 403 includes the collocated block 2010 in the merge mode candidate block for predicting the current block only when two motion vectors mvL0_col and mvL1_col of the collocated block 2010 indicate the same reference picture n-2 and a difference value between the two motion vectors mvL0_col and mvL1_col is less than a threshold value, and excludes the collocated block 2010 from the merge mode candidate block when the two motion vectors indicate different reference pictures or the difference value between the motion vectors is equal to or greater than the predetermined threshold value.

The method and apparatus for encoding an image according to exemplary embodiments limits bidirectional motion estimation or limits block merging based on whether reference pictures are the same and on a difference value between two motion vectors.

Figure 21:
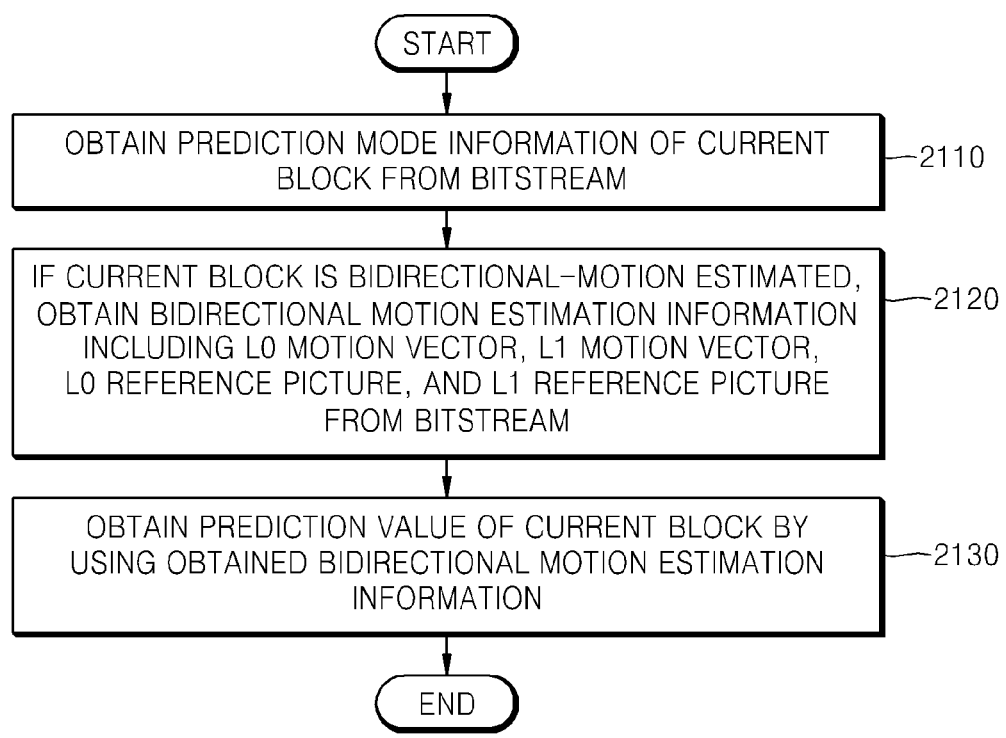
FIG. 21 is a flowchart illustrating a method of decoding an image, according to an exemplary embodiment.

FIG. 21 is a flowchart illustrating a method of decoding an image, according to an exemplary embodiment.

Referring to FIGS. 5 and 21, in operation 2110, the entropy decoder 520 obtains prediction mode information of a current block from a bitstream.

In operation 2120, if the current block is bidirectional motion estimated, the motion compensator 560 obtains bidirectional motion estimation information including an L0 motion vector, an L1 motion vector, an L0 reference picture, and an L1 reference picture of the current block from the bitstream.

In operation 2130, the motion compensator 560 obtains a prediction value of the current block by using the obtained bidirectional motion estimation information. According to an exemplary embodiment, a bidirectional motion estimated block has always the same reference picture and the L0 motion vector and the L1 motion vector having a difference equal to or less than a predetermined threshold value during encoding.

FIG. 22 is a flowchart illustrating a method of decoding an image, according to another exemplary embodiment.

Referring to FIGS. 5 and 22, in operation 2210, the entropy decoder 520 obtains prediction mode information of a current block from a bitstream. In operation 2220, if a prediction mode of the current block is a merge mode that uses motion information of one block selected from temporally and spatially related merge mode candidate blocks as motion information of the current block, for a bidirectional motion estimated merge mode candidate block from among the merge mode candidate blocks, a merge mode candidate block determiner 519 of the merge mode predictor 590 obtains final merge mode candidate blocks by including or excluding the bidirectional motion estimated merge mode candidate block in or from the merge mode candidate blocks based on whether the L0 reference picture and the L1 reference picture of the bidirectional motion estimated merge mode candidate block are the same and a difference value between the L0 motion vector and the L1 motion vector.

In operation 2230, the merge mode predictor 590 obtains merged block index information indicating one from among the final merge mode candidate blocks from the bitstream.

In operation 2240, the merge mode predictor 590 selects one candidate block from among blocks included in the final merge mode candidate blocks based on the merged block index information, and obtains a prediction value of the current block by using motion information of the selected candidate block. For example, referring back to FIG. 19, when it is assumed that the neighboring block B0 of a current block 1901 is merged with the current block 1901, encoding information for the current block 1901 includes merging flag, merged block index information indicating the neighboring block B0, and residual data. When the merging flag of the current block is 1, the merge mode predictor 590 obtains the merged block index information indicating the neighboring block B0 from the bitstream. Also, the merge mode predictor 590 obtains a prediction value of the current block 1901 through bidirectional motion estimation by using motion information of the neighboring block B0, and decodes the current block 1901 by adding residual that is obtained and restored from the bitstream to the prediction value.

One or more exemplary embodiments may be written as computer programs and may be implemented in general-use digital computers that execute the programs by using a computer-readable recording medium. Examples of the computer-readable recording medium include magnetic storage media (e.g., a read-only memory (ROM), a floppy disc, and a hard disc), and optically readable media (e.g., a compact disc-read only memory (CD-ROM) and a digital versatile disc (DVD)). Furthermore, it is understood that one or more of the above-described elements may be implemented in or by at least one processor including circuitry.

While exemplary embodiments have been particularly shown and described above, it will be understood by those of ordinary skill in the art that various changes in form and details may be made therein without departing from the spirit and scope of the invention as defined by the appended claims. Exemplary embodiments should be considered in a descriptive sense only and not for purposes of limitation. Therefore, the scope of the invention is defined not by the detailed description of exemplary embodiments but by the appended claims, and all differences within the scope will be construed as being included in the present invention.

The invention claimed is:

1. A method of encoding an image, the method comprising:
   determining, for a current block, bidirectional motion estimation information comprising an L0 motion vector, an L1 motion vector, an L0 reference picture, and an L1 reference picture by performing bidirectional motion estimation on the current block;
   determining whether to use the determined bidirectional motion estimation information as prediction information of the current block based on whether the L0 reference picture and the L1 reference picture are the same and based on a difference value between the L0 motion vector and the L1 motion vector; and
   in response to determining to use the determined bidirectional motion estimation information as the prediction information of the current block, encoding the determined bidirectional motion estimation information as the prediction information of the current block.

2. The method of claim 1, wherein the determining comprises:
   if the L0 reference picture and the L1 reference picture are the same picture that is temporally processed earlier than a picture including the current block and the difference value between the L0 motion vector and the L1 motion vector is less than a predetermined threshold value, determining to use the determined bidirectional motion estimation information as the prediction information of the current block.

3. The method of claim 1, wherein the determining comprises:
   if the L0 reference picture or the L1 reference picture are the same picture that is temporally processed earlier than a picture including the current block and the difference value between the L0 motion vector and the L1 motion vector is equal to or greater than a predetermined threshold value, determining not to use the determined bidirectional motion estimation information as the prediction information of the current block.

4. The method of claim 3, further comprising, in response to determining not to use the determined bidirectional motion estimation information as the prediction information of the current block, determining a prediction mode having a least cost by performing at least one of unidirectional prediction and intra prediction on the current block and encoding the prediction information of the current block according to the determined prediction mode.

5. The method of claim 1, wherein the determining comprises:
   if the L0 reference picture or the L1 reference picture is a picture that is temporally processed earlier than a picture including the current block and the L0 reference picture and the L1 reference picture are not the same, determining to use the determined bidirectional motion estimation information as the prediction information of the current block.

6. An apparatus for encoding an image, the apparatus comprising:
   a motion estimator configured to determine, for a current block, bidirectional motion estimation information comprising an L0 motion vector, an L1 motion vector, an L0 reference picture, and an L1 reference picture by performing bidirectional motion estimation on the current block, and to determine whether to use the determined bidirectional motion estimation information as prediction information of the current block based on whether the L0 reference picture and the L1 reference picture are the same based on a difference value between the L0 motion vector and the L1 motion vector; and
   an entropy encoder configured to, in response to the motion estimator determining to use the determined bidirectional motion estimation information as the prediction information of the current block, encode the determined bidirectional motion estimation information as the prediction information of the current block.

* * * * *